(12) United States Patent
Hsueh et al.

(10) Patent No.: US 8,755,130 B2
(45) Date of Patent: Jun. 17, 2014

(54) ZOOM LENS DEVICE

(71) Applicant: Asia Optical Co., Inc., Taichung (TW)

(72) Inventors: Chun-Yu Hsueh, Taichung (TW); Tun-Kuei Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 13/802,913

(22) Filed: Mar. 14, 2013

(65) Prior Publication Data

US 2013/0242410 A1    Sep. 19, 2013

(30) Foreign Application Priority Data

Mar. 19, 2012    (TW) .............................. 101109348 A

(51) Int. Cl.
*G02B 15/14*    (2006.01)

(52) U.S. Cl.
USPC ............ 359/700; 359/701; 359/699; 359/704

(58) Field of Classification Search
USPC ................... 359/694–704, 811–824
See application file for complete search history.

(56) References Cited

U.S. PATENT DOCUMENTS

| | | | |
|---|---|---|---|
| 6,456,445 B2 * | 9/2002 | Nomura et al. | 359/699 |
| 7,864,448 B2 * | 1/2011 | Huang et al. | 359/704 |
| 2001/0017736 A1 * | 8/2001 | Nomura et al. | 359/699 |

* cited by examiner

*Primary Examiner* — Mohammed Hasan
(74) *Attorney, Agent, or Firm* — Trop, Pruner & Hu, P.C.

(57) ABSTRACT

A zoom lens device includes a base barrel, first and second cam barrels connected rotatably to and movable relative to the base barrel, first and second lens barrels connected respectively to the first and second cam barrels, and a driving barrel surrounding and rotatable relative to the base barrel. Rotation of the driving barrel drives the first and second cam barrels to rotate synchronously and move individually along an axis, and therefore causes individual axial movements of the first and second lens barrels along the axis.

11 Claims, 26 Drawing Sheets

ZOOM LENS DEVICE

CROSS-REFERENCE TO RELATED APPLICATION

This application claims priority of Taiwanese Application No. 101109348, filed on Mar. 19, 2012.

BACKGROUND OF THE INVENTION

1. Field of the Invention

The invention relates to a zoom lens device, more particularly to a zoom lens device having a relatively wide zoom adjusting range.

2. Description of the Related Art

Referring to FIGS. 1, 2 and 3, a conventional zoom lens device is capable of zooming along an axis (A). The zoom lens device includes a base barrel 1, a rotating barrel 2 surrounding and rotatable relative to the base barrel 1, a cam barrel 3 connected to the base barrel 1, co-rotatable with the rotating barrel 2, and movable relative to the base barrel 1 along the axis (A), first and second guide barrels 4, 5 connected co-movably to the cam barrel 3 along the axis (A), a first lens barrel 6 connected to the first guide barrel 4 and movable relative to the first guide barrel 4 along the axis (A), a second lens barrel 7 connected to the second guide barrel 5 and movable relative to the second guide barrel 5 along the axis (A), and a plurality of guide pins (not shown). The base barrel 1 is formed with a plurality of angularly spaced-apart guide grooves 101. Each guide pin is secured fixedly to the cam barrel 3, extends slidably through a respective one of the guide grooves 101, and is connected slidably to the rotating barrel 2. The cam barrel 3 has an outer surrounding surface formed with a plurality of angularly spaced-apart first cam grooves 301, and an inner surrounding surface formed with a plurality of angularly spaced-apart second cam grooves 302. The first lens barrel 6 has a plurality of angularly spaced-apart first pins 601 engaging slidably and respectively the first cam grooves 301. The second lens barrel 7 has a plurality of angularly spaced-apart second pins 701 engaging slidably and respectively the second cam grooves 302. The rotating barrel 2 is rotatable to drive rotation of the cam barrel 3 and therefore to cause axial movements of the first and second lens barrels 6, 7 via the engagement between the guide pins and the guide grooves 101, the engagement between the first pins 601 and the first cam grooves 301, and the engagement between the second pins 701 and the second cam grooves 302.

When the rotating barrel 2 is driven to rotate by a motor (not shown), the conventional zoom lens device can switch between a telephoto state (see FIG. 2) where the first and second lens barrels 6, 7 are close to each other, and a wide-angle state (see FIG. 3) where the first and second lens barrels 6, 7 are far from each other.

The axial movement of the first lens barrel 6 relative to the base barrel 1 is guided cooperatively by the guide grooves 101 and the first cam grooves 301, and the axial movement of the second lens barrel 7 relative to the base barrel 1 is guided cooperatively by the guide grooves 101 and the second cam grooves 302 in the cam barrel 3. Although the first lens barrel 6 of this conventional zoom lens device has a long extent in stretching relative to the base barrel 1, when the first lens barrel 6 and the cam barrel 3 are at their utmost stretching positions, the axial movement of the second lens barrel 7 along the axis (A) relative to the first lens barrel 6 is limited by a thickness and the position of the cam barrel 3. As a result, the conventional zoom lens device has relatively small zoom adjusting range.

Taiwanese Patent Application Publication No. 201013247 discloses another conventional zoom lens device which includes two lens barrels connected to an inner surface of a cam barrel of the zoom lens device. As such, only a single guide barrel is required to guide linear motions of the two lens barrels. However, such zoom lens device with fewer elements also has the abovementioned drawback.

SUMMARY OF THE INVENTION

Therefore, the object of the present invention is to provide a zoom lens device having a wider zoom adjusting range.

Accordingly, a zoom lens device of the present invention comprises:
  a base barrel surrounding an axis;
  a first transmitting assembly including
    a first guide barrel that is connected to an inner surface of the base barrel and that is movable relative to the base barrel along the axis,
    a first cam barrel that is connected co-movably to and rotatable about the axis relative to the first guide barrel, and that is formed with a plurality of angularly spaced-apart first lens grooves, and
    a first lens barrel that is connected to the first guide barrel, that is movable relative to the first guide barrel along the axis, and that has a plurality of angularly spaced-apart first guide pins engaging slidably and respectively the first lens grooves;
  a second transmitting assembly including
    a second guide barrel that is connected to the inner surface of the base barrel and that is movable relative to the base barrel along the axis,
    a second cam barrel that is connected co-movably to and rotatable about the axis relative to the second guide barrel, that is connected co-rotatably to and movable along the axis relative to the first cam barrel, and that is formed with a plurality of angularly spaced-apart second lens grooves, and
    a second lens barrel that is connected to the second guide barrel, that is movable relative to the second guide barrel along the axis, and that has a plurality of angularly spaced-apart second guide pins engaging slidably and respectively the second lens grooves;
  a driving barrel surrounding the base barrel and rotatable about the axis;
  a driving mechanism including
    a plurality of angularly spaced-apart driving grooves that are formed in the driving barrel and that extend in a direction of the axis,
    a plurality of angularly spaced-apart first cam grooves that are formed in the base barrel, and
    a plurality of angularly spaced-apart driving pins that are disposed on the first cam barrel, each of the driving pins extending through and being slidably along a respective one of the first cam grooves, and engaging slidably a respective one of the driving grooves; and
  a driven mechanism including
    a plurality of angularly spaced-apart second cam grooves that are formed in one of the base barrel and the driving barrel, and
    a plurality of angularly spaced-apart driven pins that are disposed on one of the second cam barrel and the second guide barrel that is angularly displaceable relative to said one of the base barrel and the driving barrel, each of the driven pins engaging slidably a respective one of the second cam grooves;

wherein, rotation of the driving barrel drives the first and second cam barrels to rotate synchronously and move individually along the axis via the driving and driven mechanisms, and therefore causes individual axial movements of the first and second lens barrels via the driving and driven mechanisms and via the engagement between the first guide pins and the first lens grooves and the engagement between the second guide pins and the second lens grooves, thereby resulting in zoom adjustment of the zoom lens device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
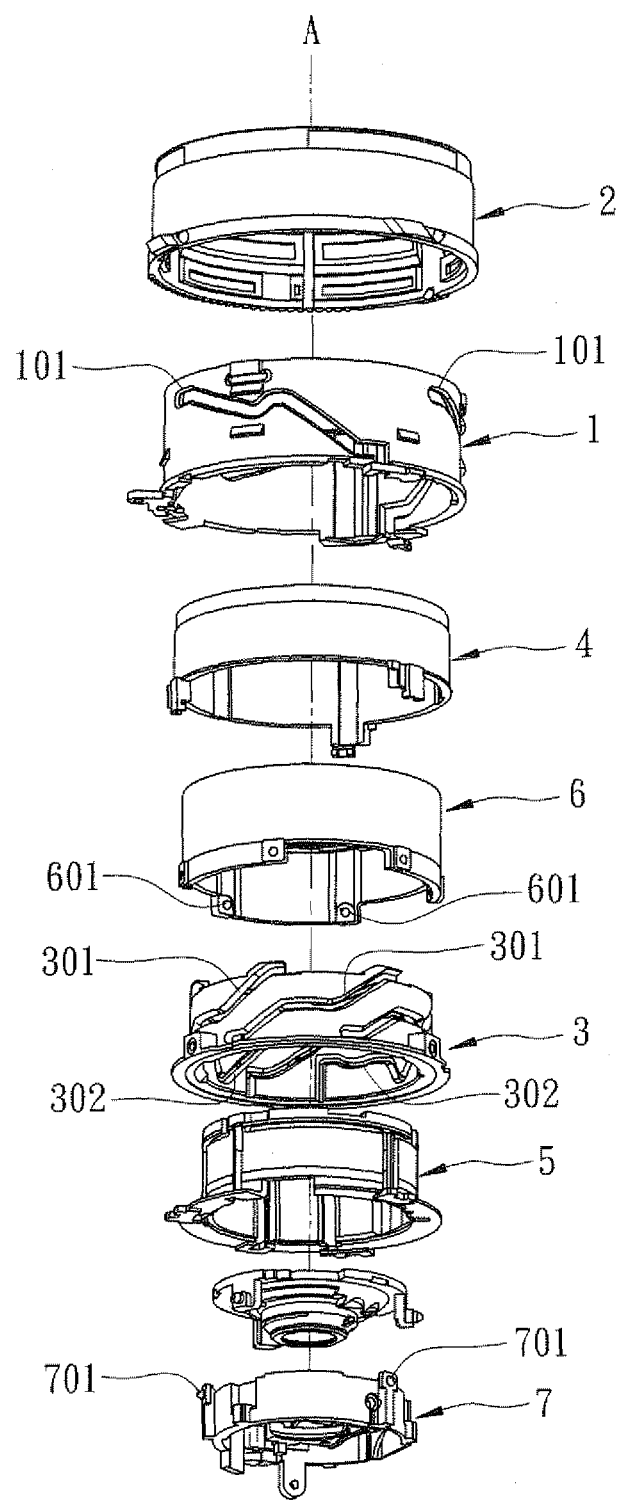
FIG. 1 is an exploded perspective view of a conventional zoom lens device.
Figure 2:
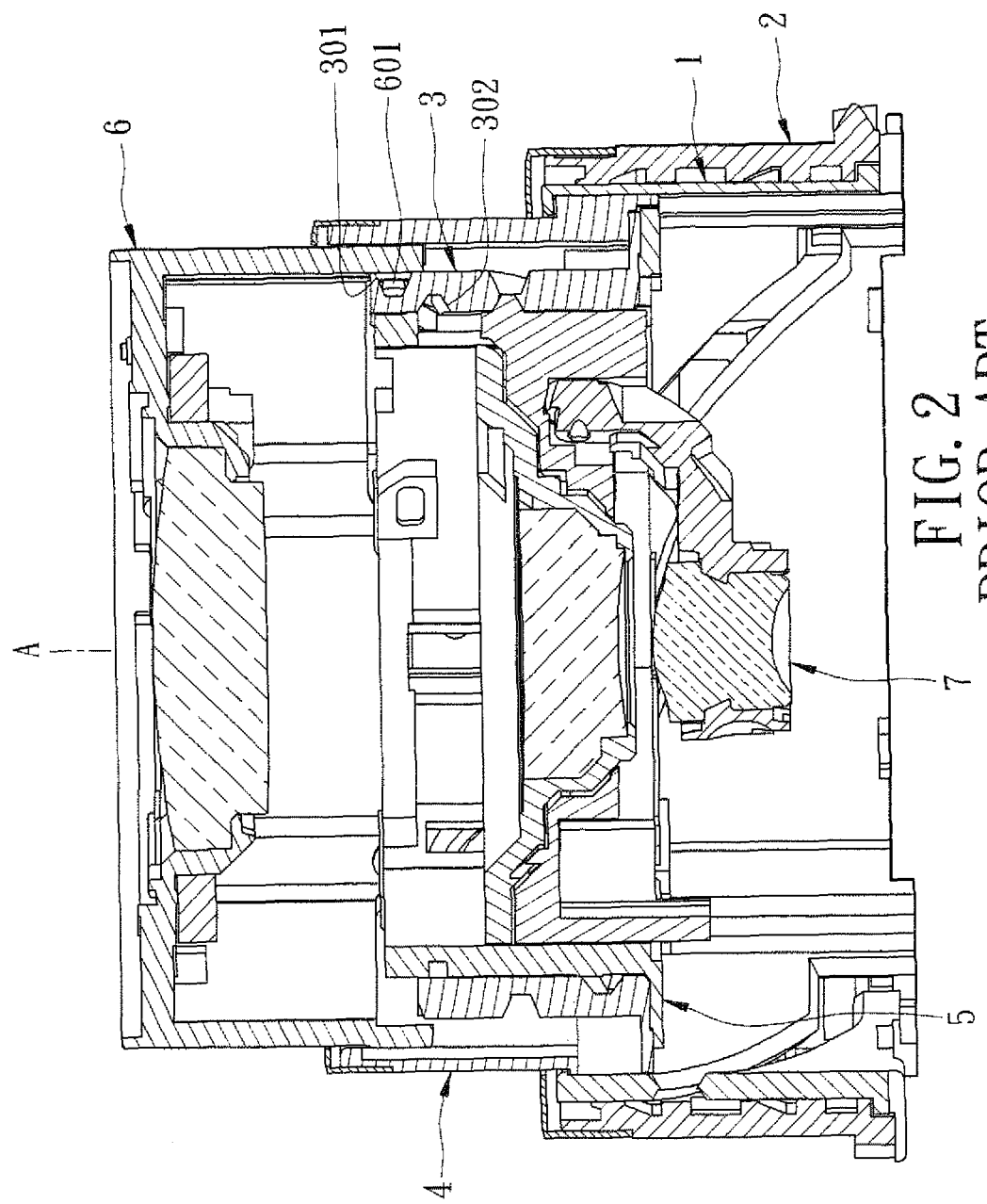
FIG. 2 is a sectional view of the conventional zoom lens device in a telephoto state.
Figure 3:
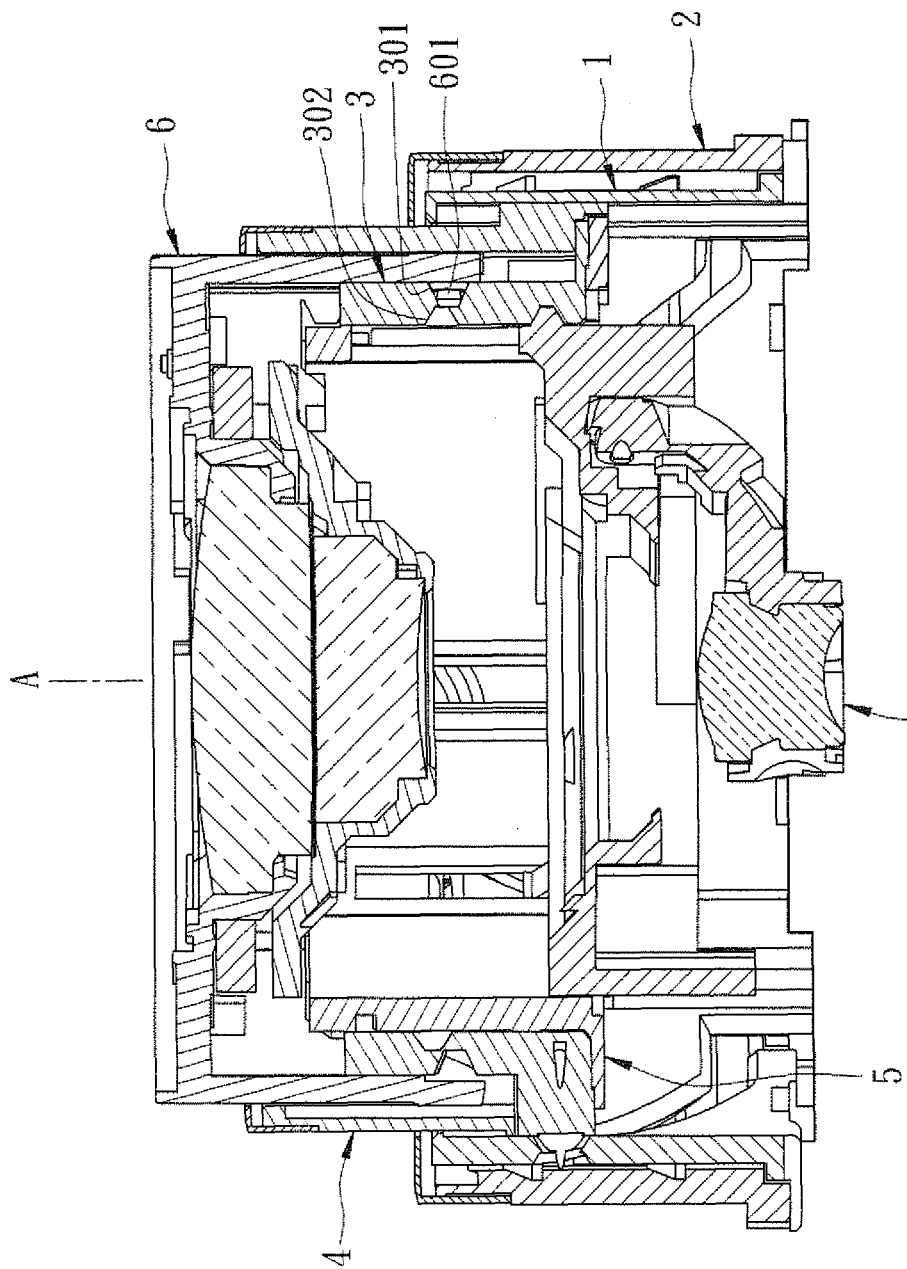
FIG. 3 is another sectional view of the conventional zoom lens device in a wide-angle state.

Before the present invention is described in greater detail, it should be noted that like elements are denoted by the same reference numerals throughout the disclosure.

Figure 4:
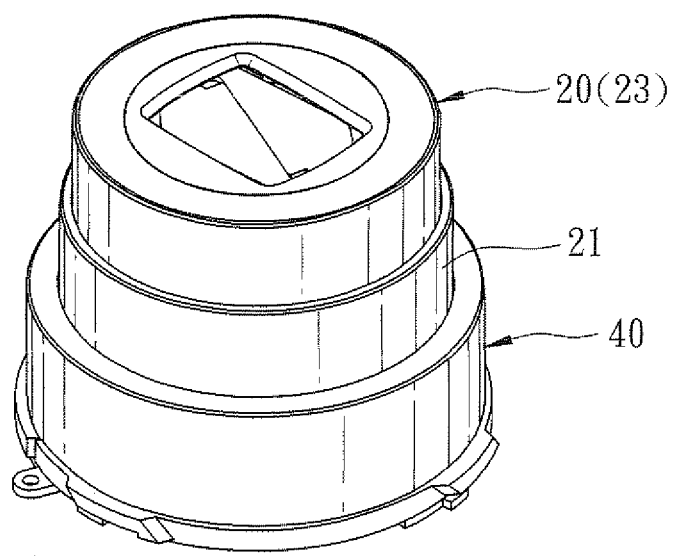
FIG. 4 is a perspective view of a first preferred embodiment of a zoom lens device according to the invention.
Figure 5:
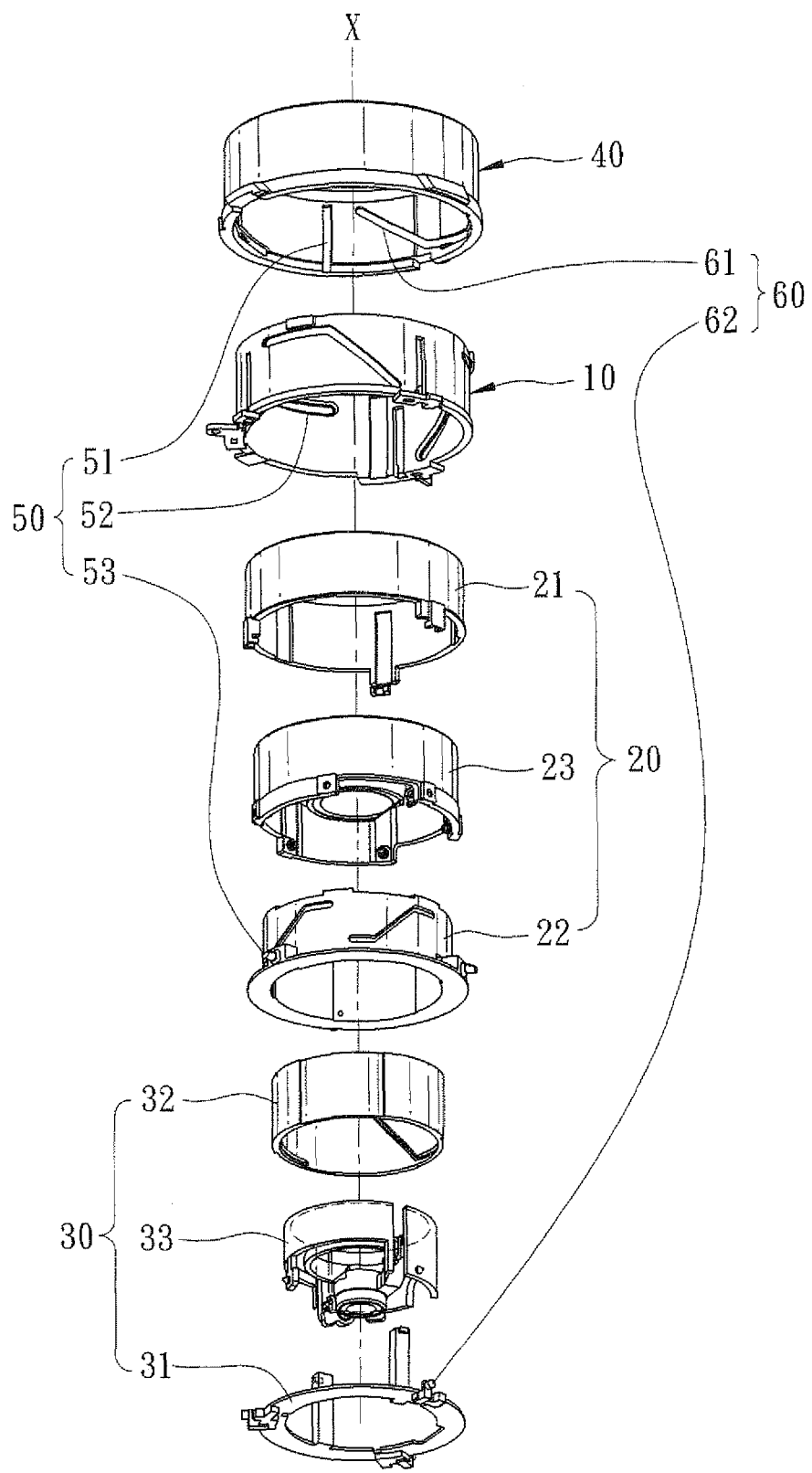
FIG. 5 is an exploded perspective view of the first preferred embodiment.

As shown in FIGS. 4 and 5, a first preferred embodiment of a zoom lens device according to the present invention is capable of zooming along an axis (X). The zoom lens device comprises a base barrel 10, a first transmitting assembly 20, a second transmitting assembly 30, a driving barrel 40, a driving mechanism 50, and a driven mechanism 60.

Figure 6:
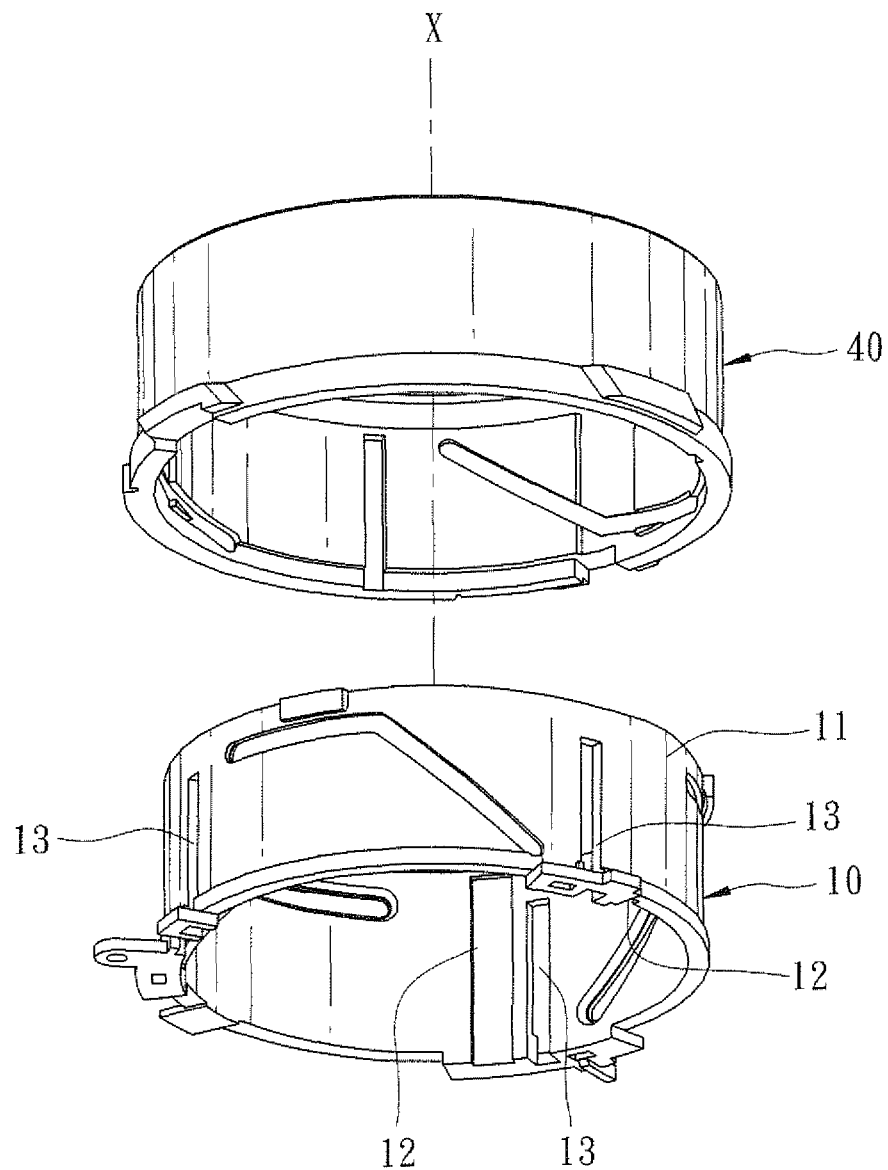
FIG. 6 is an exploded perspective view of a base barrel and a driving barrel of the first preferred embodiment.

As shown in FIG. 6, the base barrel 10 has a base barrel wall 11 surrounding the axis (X) and having opposite inner and outer surrounding surfaces, a plurality of angularly spaced-apart first straight grooves 12 formed in the inner surrounding surface and extending in a direction of the axis (X), and a plurality of angularly spaced-apart second straight grooves 13 formed through the inner and outer surrounding surfaces and extending in the direction of the axis (X).

Figure 7:
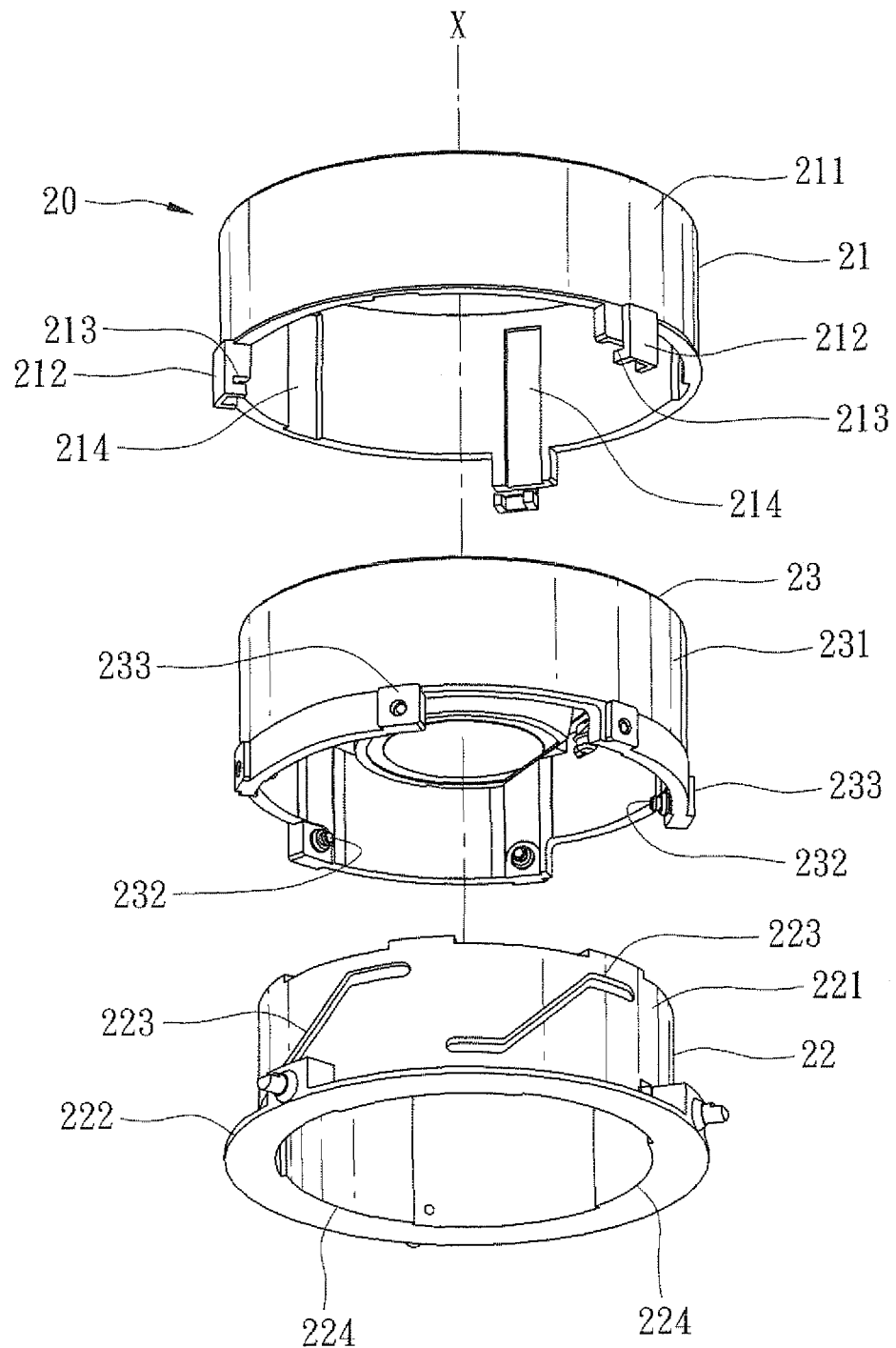
FIG. 7 is an exploded perspective view of a first transmitting assembly of the first preferred embodiment.
Figure 8:
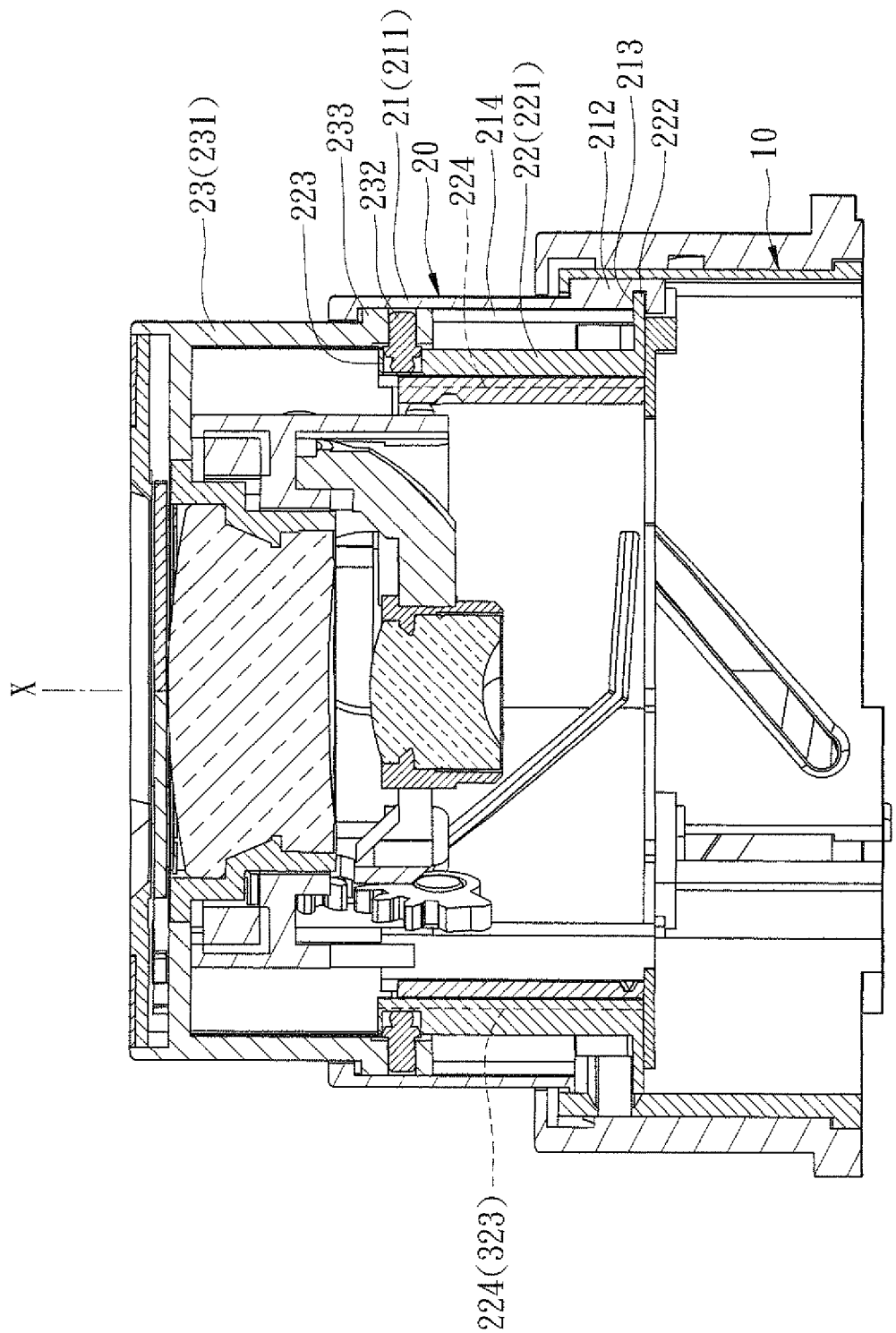
FIG. 8 is a sectional view of the first preferred embodiment in a telephoto state.

As shown in FIGS. 7 and 8, the first transmitting assembly 20 includes a first guide barrel 21 connected to the inner surrounding surface of the base barrel wall 11 and movable relative to the base barrel 10 along the axis (X), a first cam barrel 22 connected co-movably to and rotatable about the axis (X) relative to the first guide barrel 21, and a first lens barrel 23 connected to the first guide barrel 21 and movable relative to the first guide barrel 21 along the axis (X).

The first guide barrel 21 has: a first guide barrel wall 211, a plurality of angularly spaced-apart first blocks 212 that extend rearward from a rear end of the first guide barrel wall 211 in the direction of the axis (X), that engage slidably and respectively the first straight grooves 12, and that are contained in the base barrel 10, and a plurality of angularly spaced-apart holding grooves 213. Each of the holding grooves 213 is formed in an inner side of a respective one of the first blocks 212 and extends in a circumferential direction with respect to the axis (X). The first guide barrel 21 further has a plurality of angularly spaced-apart first guide grooves 214 formed in an inner surrounding surface of the first guide barrel wall 211 and extending in the direction of the axis (X).

The first cam barrel 22 has a first cam barrel wall 221 having opposite inner and outer surrounding surfaces, and an annular flange portion 222 extending radially and outwardly from a rear end of the first cam barrel wall 221 and engaging slidably the holding grooves 213 for permitting axial movement along with the first guide barrel 21 and rotation relative to the first guide barrel 21 of the first cam barrel 22. The first cam barrel 22 further has a plurality of angularly spaced-apart first lens grooves 223 formed in the outer surrounding surface of the first cam barrel wall 221, and a plurality of angularly spaced-apart engaging blocks 224 extending from the inner surrounding surface of the first cam barrel wall 221 in the direction of the axis (X).

The first lens barrel 23 has a first lens barrel wall 231 having opposite inner and outer surrounding surfaces, a plurality of angularly spaced-apart first guide pins 232 disposed on the inner surrounding surface of the first lens barrel wall 231 and engaging slidably and respectively the first lens grooves 223 of the first cam barrel 22, and a plurality of angularly spaced-apart first guide blocks 233 disposed on the outer surrounding surface of the first lens barrel wall 231 and engaging slidably and respectively the first guide grooves 214.

When the first cam barrel 22 rotates relative to the first guide barrel 21, the first guide pins 232 slide respectively along the first lens grooves 223, while the first guide blocks 233 slide respectively along the first guide grooves 214, thereby allowing an axial movement of the first lens barrel 23 relative to the first guide barrel 21.

Figure 9:
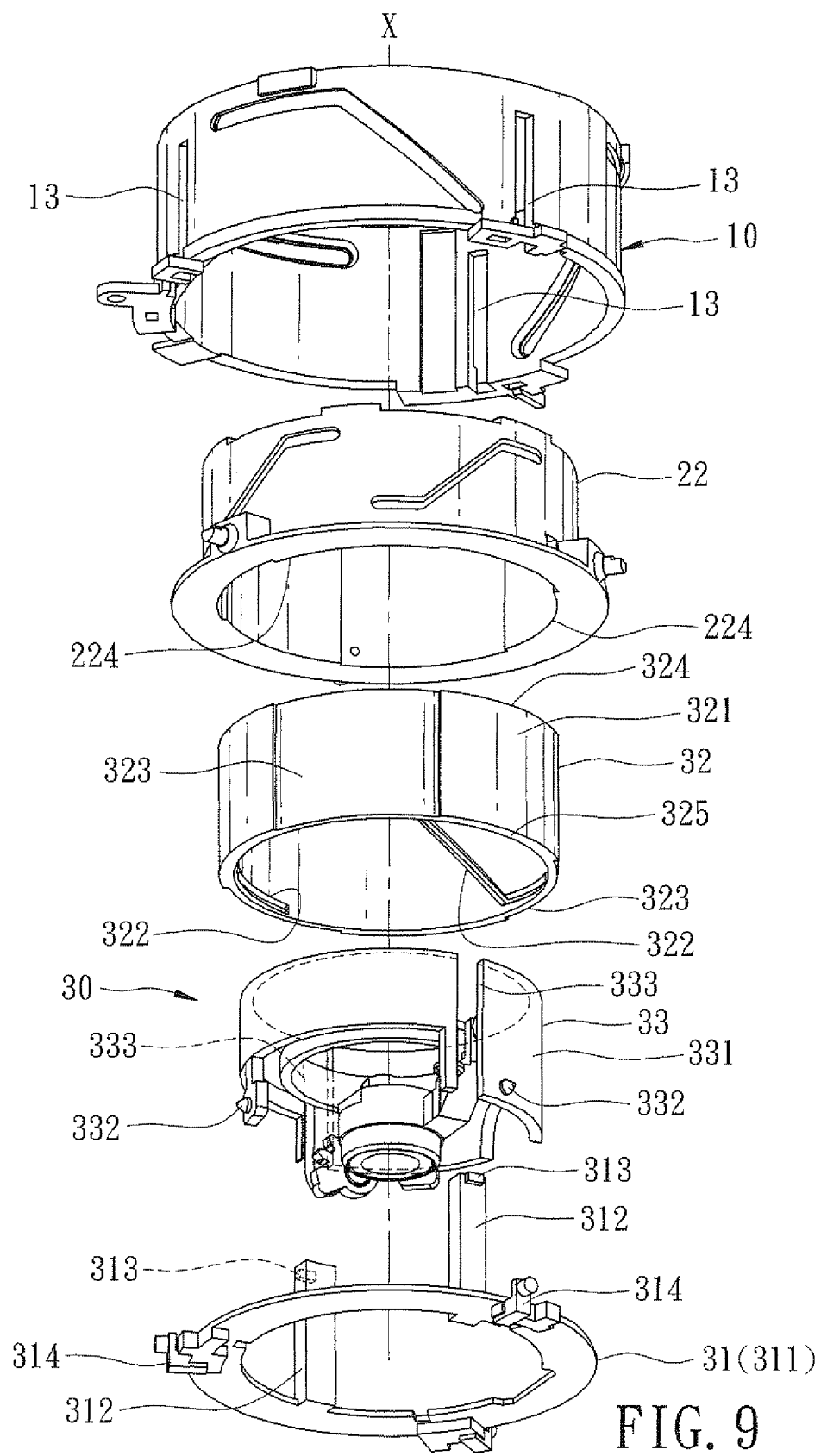
FIG. 9 is an exploded perspective view of a second transmitting assembly, a first cam barrel and the base barrel of the first preferred embodiment.
Figure 10:
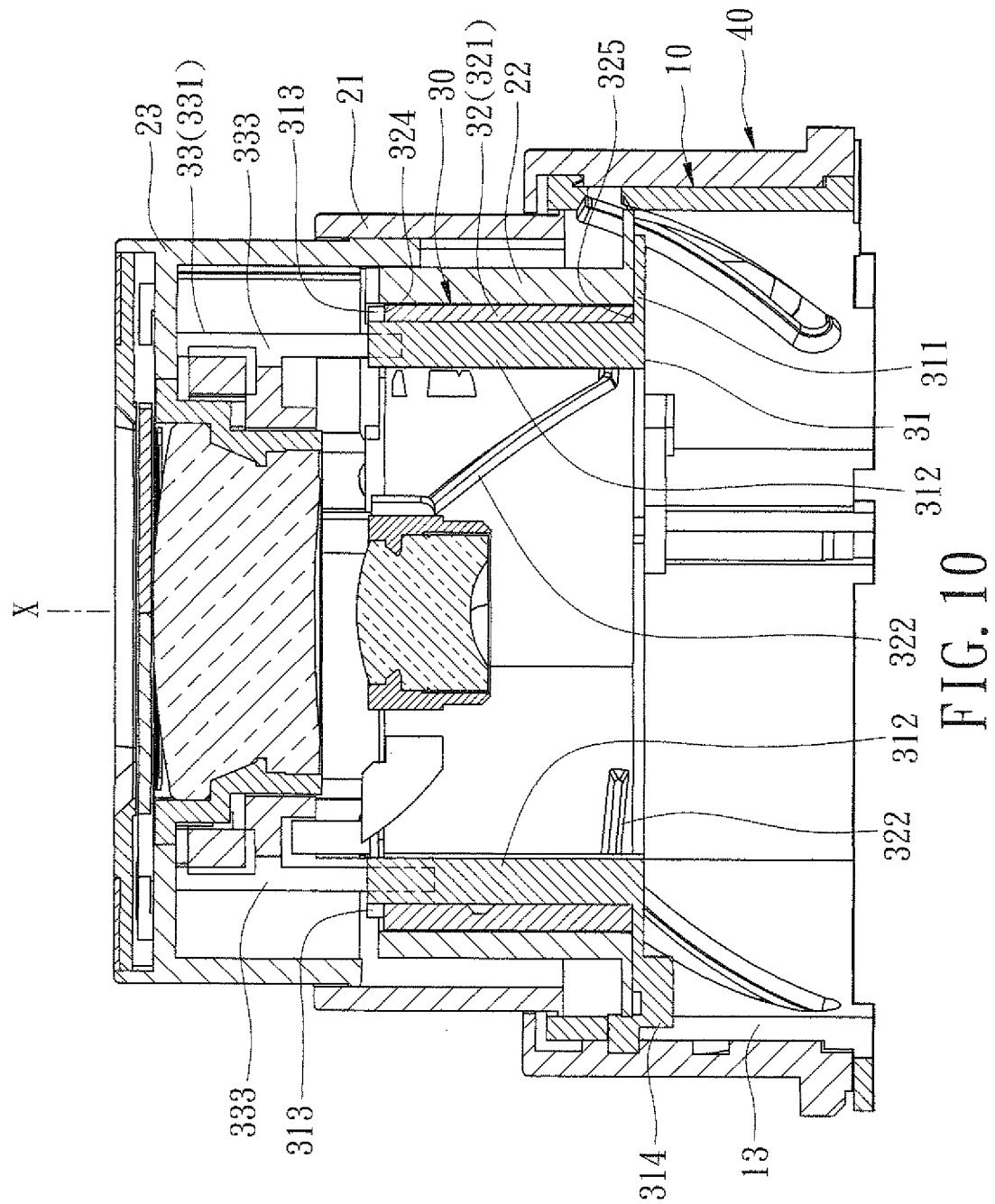
FIG. 10 is another sectional view of the first preferred embodiment in the telephoto state.
Figure 11:
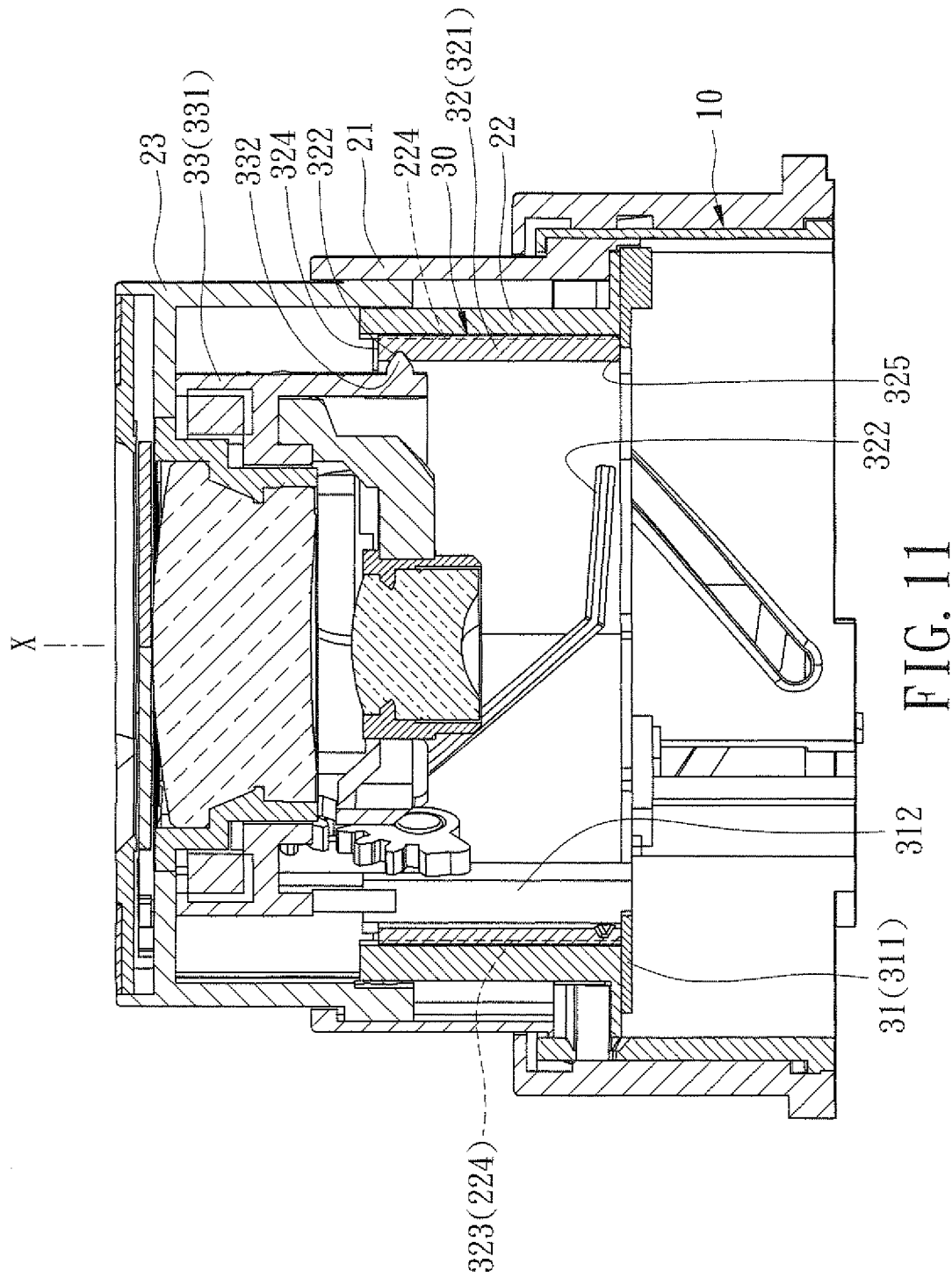
FIG. 11 is still another sectional view of the first preferred embodiment in the telephoto state.

As shown in FIGS. 9, 10 and 11, the second transmitting assembly 30 includes a second guide barrel 31 connected to the inner surrounding surface of the base barrel wall 11 and movable relative to the base barrel 10 along the axis (X), a second cam barrel 32 connected co-movably to and rotatable about the axis (X) relative to the second guide barrel 31, and a second lens barrel 33 connected to the second guide barrel 31 and movable relative to the second guide barrel 31 along the axis (X). The second cam barrel 32 is connected co-rotatably to and movable along the axis (X) relative to the first cam barrel 22.

In this embodiment, the first guide barrel 21, the first lens barrel 23, the first cam barrel 22, the second cam barrel 32, the second guide barrel 31, and the second lens barrel 33 are arranged in descending order of their distances from the axis (X).

The second guide barrel 31 has a ring wall portion 311, a pair of diametrically spaced-apart second guide blocks 312 extending forward from the ring wall portion 311 along the axis (X), a pair of holding protrusions 313 protruding radially, outwardly and respectively from ends of the second guide blocks 312 distal from the ring wall portion 311, and a plurality of angularly spaced-apart second blocks 314 disposed on the ring wall portion 311 and engaging slidably and respectively the second straight grooves 13.

The second cam barrel 32 has a second cam barrel wall 321 having opposite inner and outer surrounding surfaces and opposite first and second annular end surfaces 324, 325, a plurality of angularly spaced-apart second lens grooves 322 formed in the inner surrounding surface of the second cam barrel wall 321, and a plurality of angularly spaced-apart engaging grooves 323 formed in the outer surrounding surface of the second cam barrel wall 321, extending in the direction of the axis (X), and engaged slidably and respectively with the engaging blocks 224 for allowing a synchronous rotation and a relative axial movement of the first and second cam barrels 22, 32.

The first annular end surface 324 of the second cam barrel wall 321 is in slidable contact with the holding protrusions 313 of the second guide barrel 31, and the second annular end surface 325 of the second cam barrel wall 321 is in slidable contact with the ring wall portion 311 of the second guide barrel 31. Therefore, the second cam barrel 32 is co-movable with the second guide barrel 31 along the axis (X) and is rotatable relative to the second guide barrel 31 about the axis (X).

The second lens barrel 33 has a second lens barrel wall 331, a plurality of angularly spaced-apart second guide pins 332 disposed on an outer surrounding surface of the second lens barrel wall 331 and engaging slidably and respectively the second lens grooves 322 of the second cam barrel 32, and a pair of diametrically spaced-apart second guide grooves 333 formed in the outer surrounding surface of the second lens barrel wall 331, extending along the direction of the axis (X), and being engaged slidably and respectively with the second guide blocks 312.

When the second cam barrel 32 rotates relative to the second guide barrel 31, the second guide pins 332 slide respectively along the second lens grooves 322, while the second guide blocks 312 slide respectively along the second guide grooves 333, thereby allowing an axial movement of the second lens barrel 33 relative to the second guide barrel 31.

As shown in FIGS. 6 and 10, the driving barrel 40 surrounds the base barrel 10 and is rotatable about the axis (X).

Figure 12:
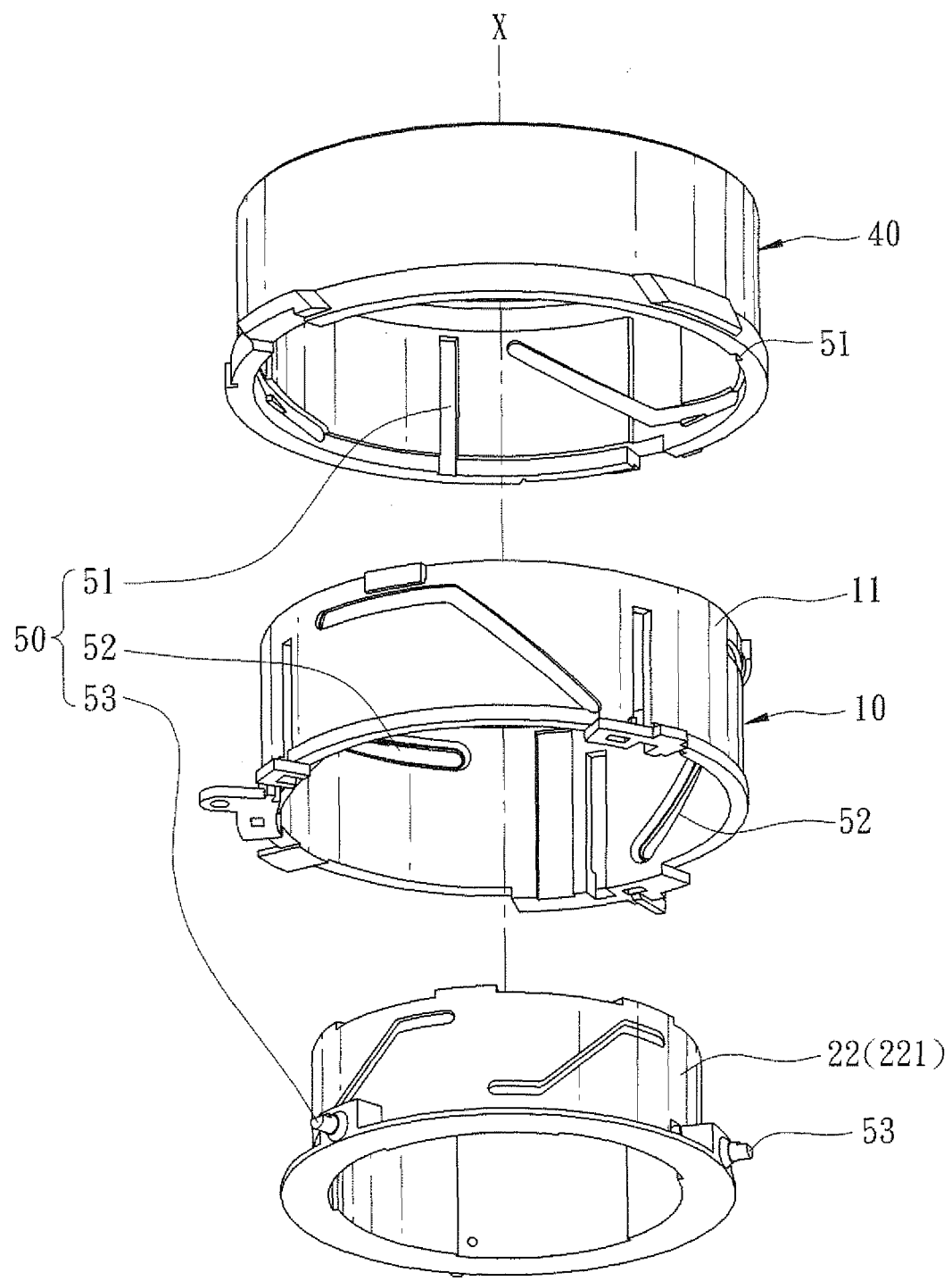
FIG. 12 is an exploded perspective view illustrating a driving mechanism of the first preferred embodiment.
Figure 13:
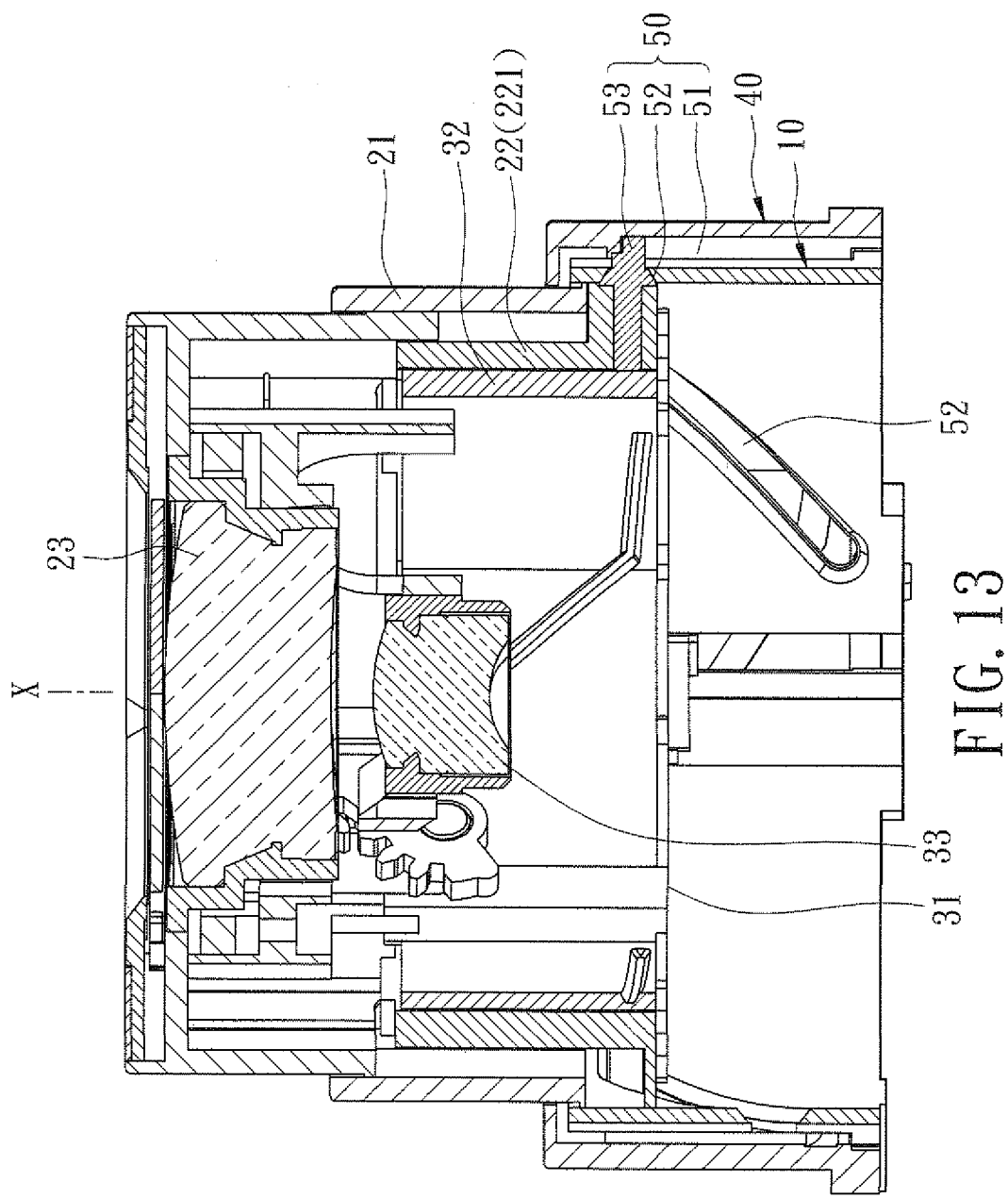
FIG. 13 is still another sectional view of the first preferred embodiment in the telephoto state.

As shown in FIGS. 12 and 13, the driving mechanism 50 includes a plurality of angularly spaced-apart driving grooves 51 formed in an inner surrounding surface of the driving barrel 40 and extending along the direction of the axis (X), a plurality of angularly spaced-apart first cam grooves 52 formed through the inner and outer surrounding surfaces of the base barrel wall 11 of the base barrel 10, and a plurality of angularly spaced-apart driving pins 53 disposed on the outer surrounding surface of the first cam barrel wall 221. Each of the driving pins 53 extends through and is slidable along a respective one of the first cam grooves 52, and engages slidably a respective one of the driving grooves 51.

Figure 14:
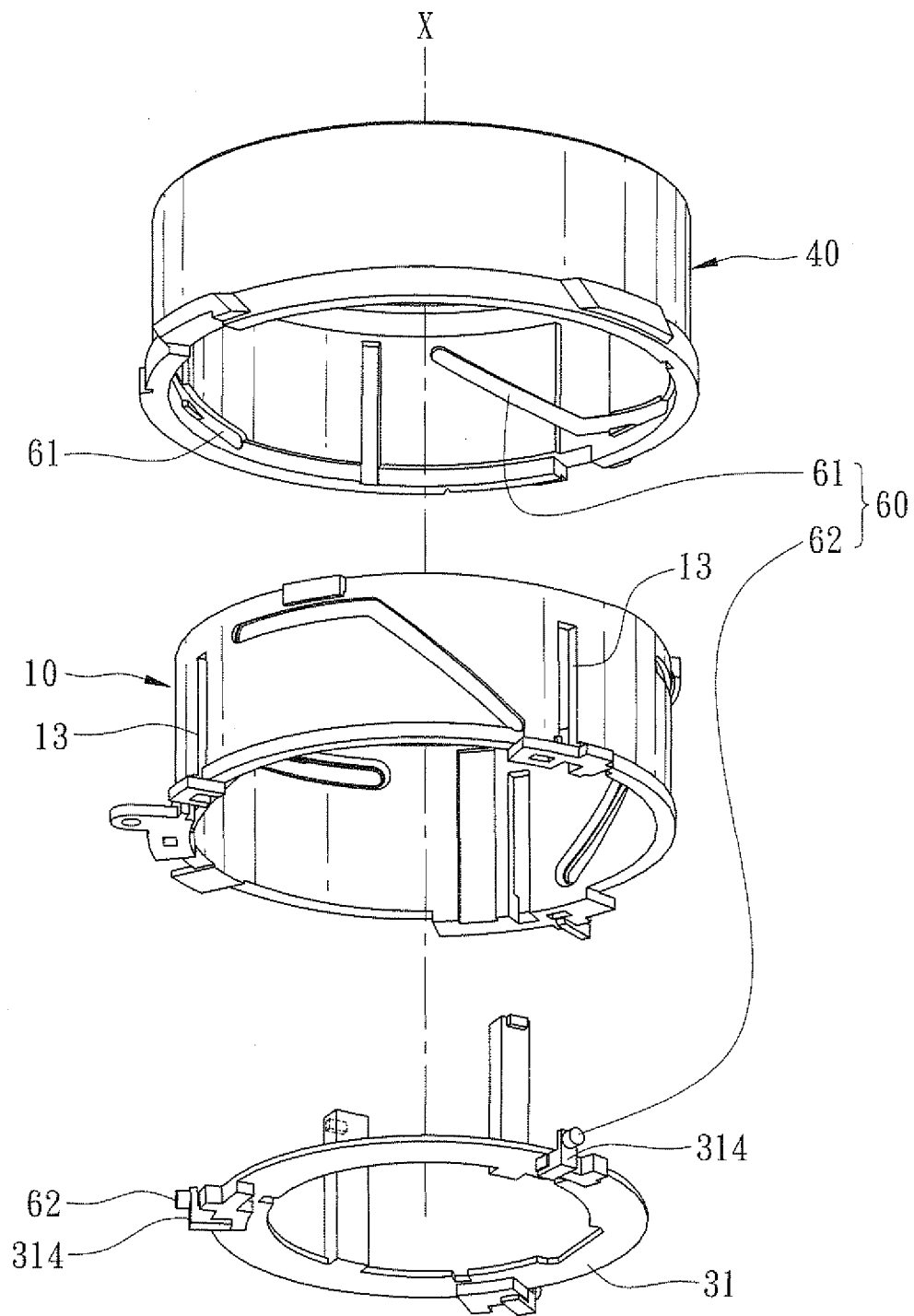
FIG. 14 is an exploded perspective view illustrating a driven mechanism of the first preferred embodiment.
Figure 15:
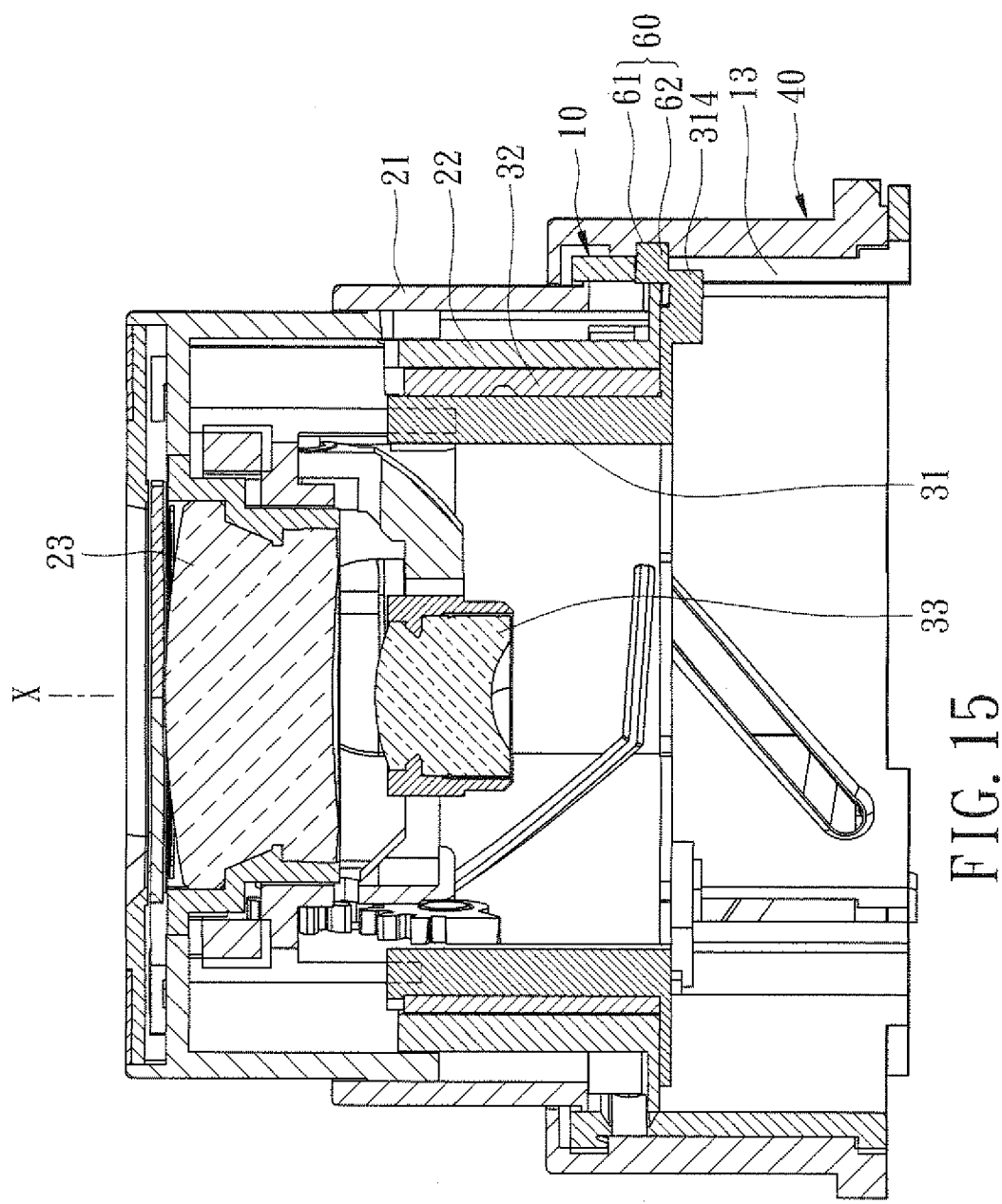
FIG. 15 is yet another sectional view of the first preferred embodiment in the telephoto state.
Figure 16:
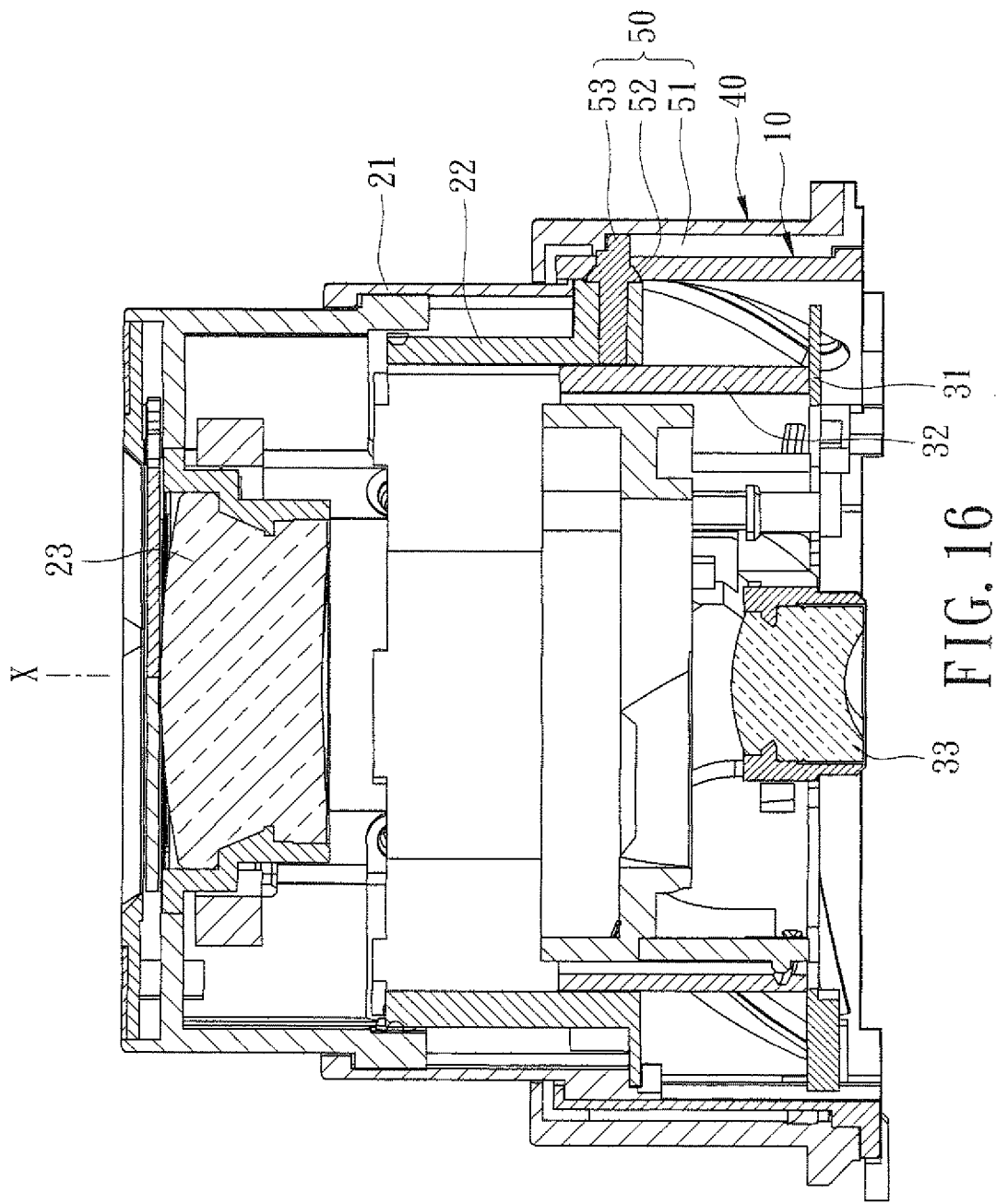
FIG. 16 is a sectional view of the first preferred embodiment in a wide-angle state.
Figure 17:
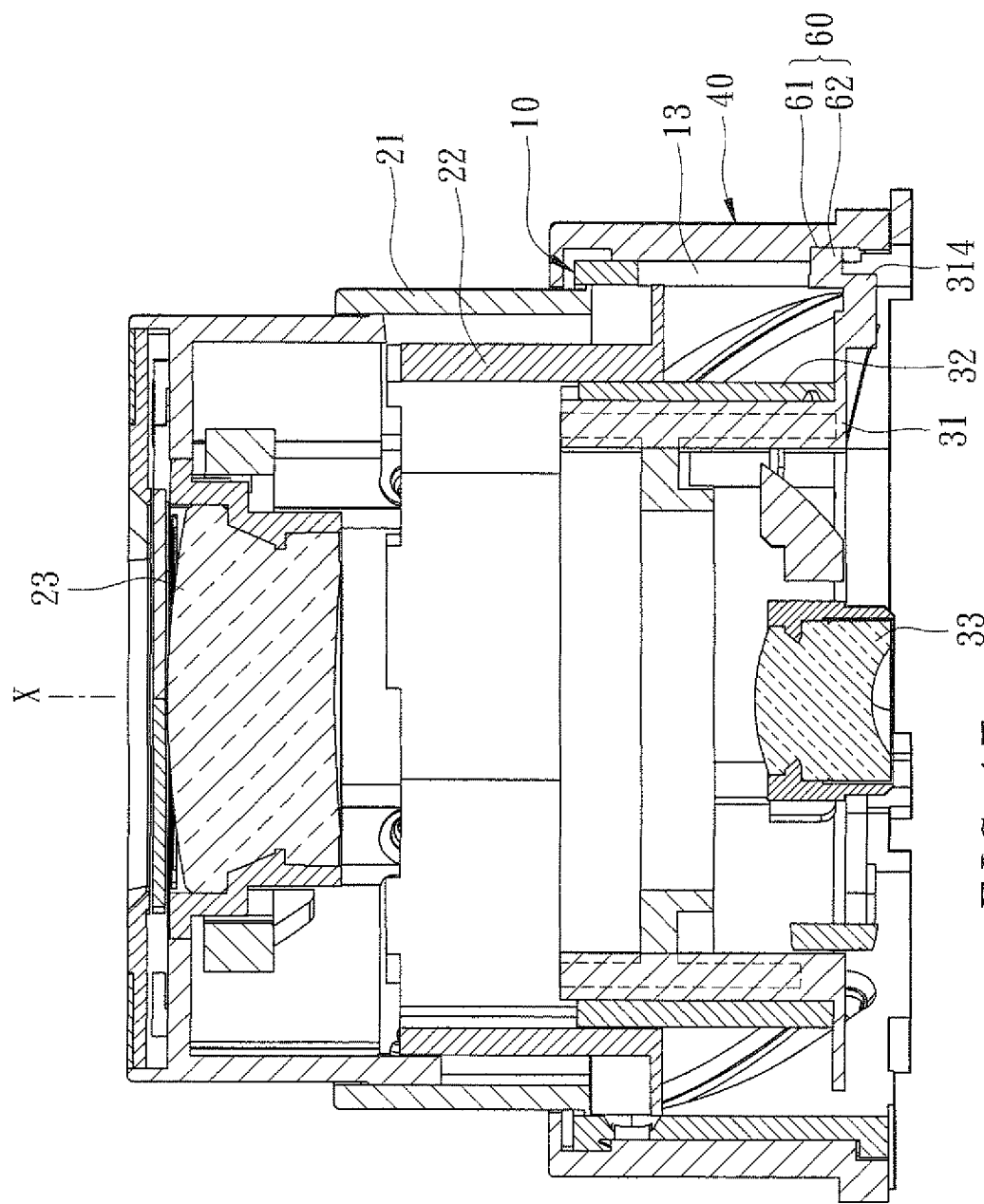
FIG. 17 is another sectional view of the first preferred embodiment in the wide-angle state.
Figure 18:
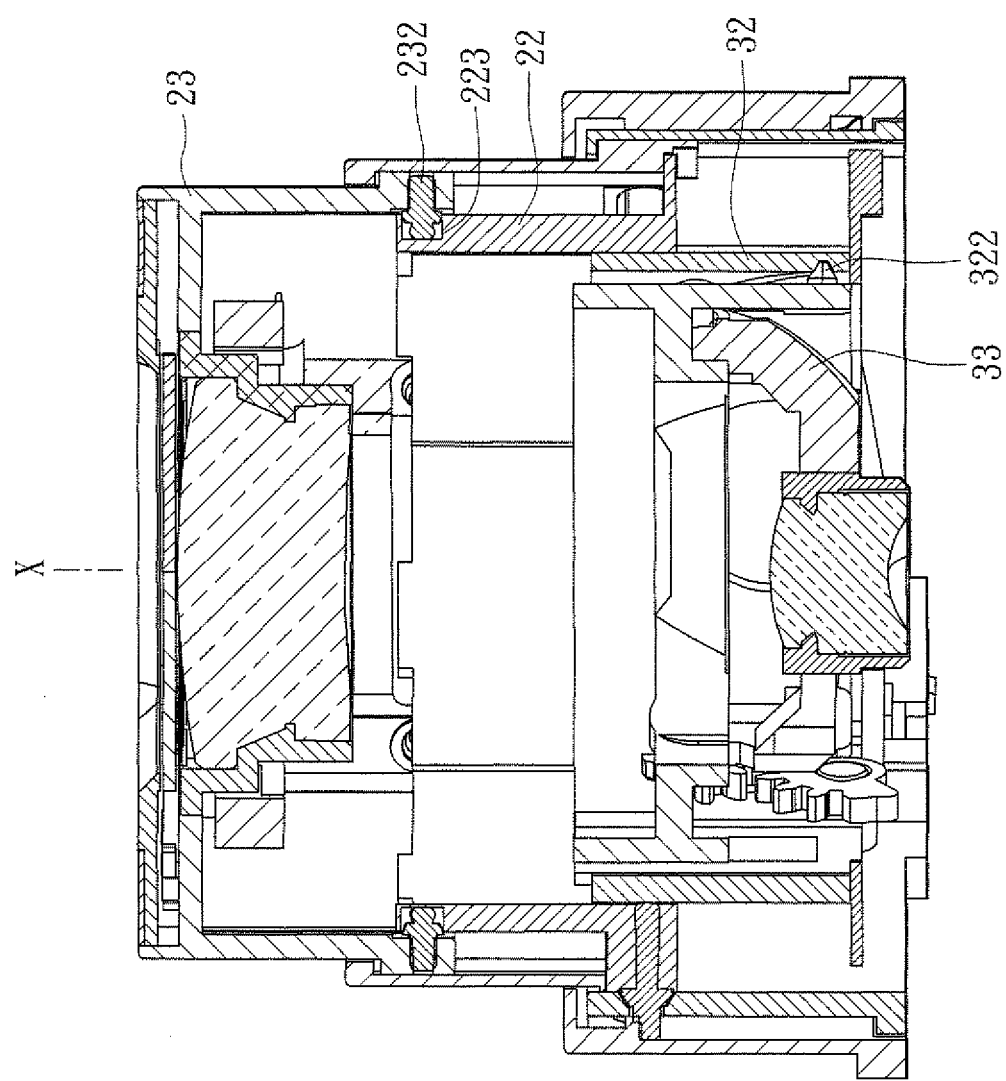
FIG. 18 is still another sectional view of the first preferred embodiment in the wide-angle state.
Figure 19:
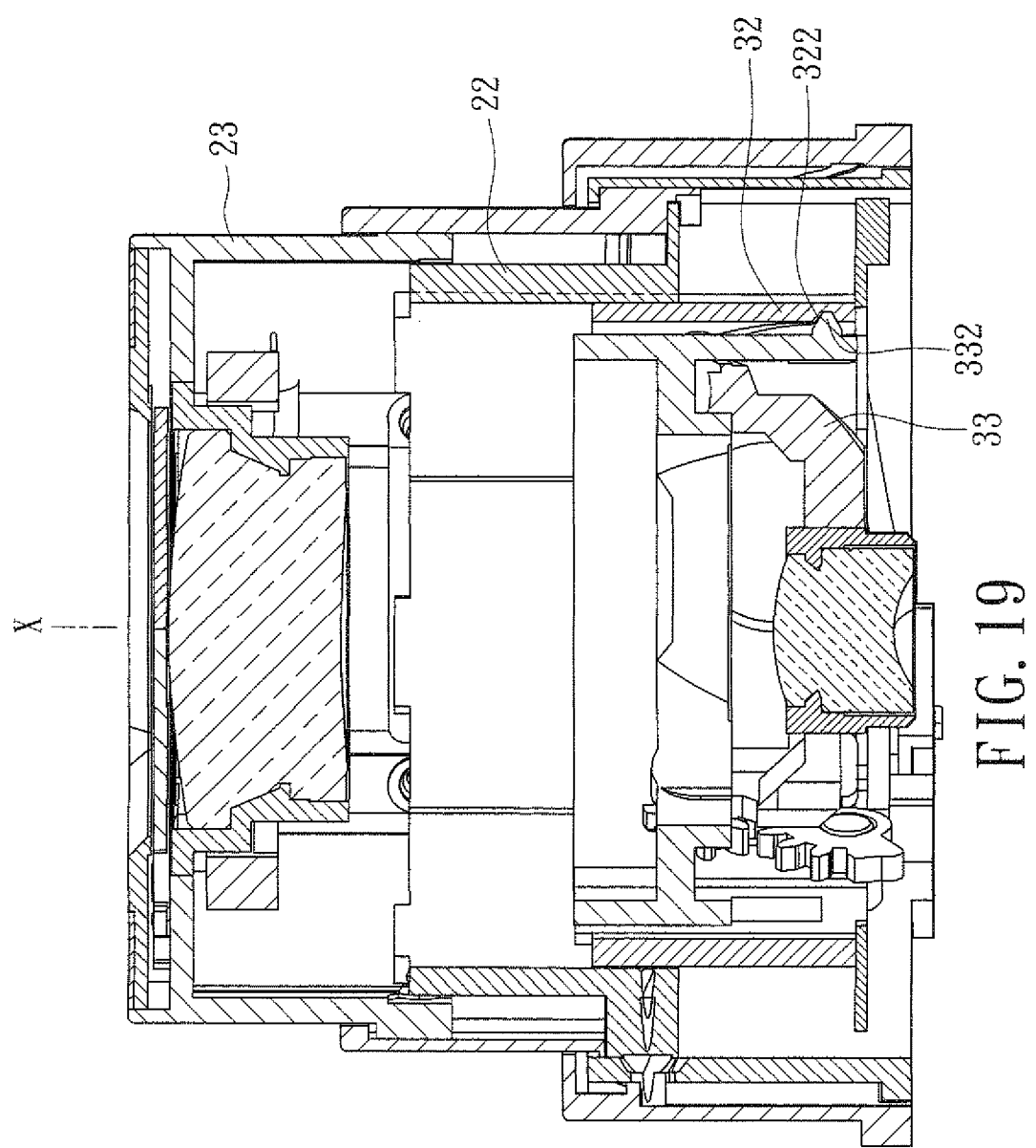
FIG. 19 is still another sectional view of the first preferred embodiment in the wide-angle state.

As shown in FIGS. 14 and 15, the driven mechanism 60 includes a plurality of angularly spaced-apart second cam grooves 61 formed in the inner surrounding surface of the driving barrel 40, and a plurality of angularly spaced-apart driven pins 62 disposed respectively on the second blocks 314 of the second guide barrel 31. Each of the driven pins 62 projects out of the base barrel 10 and engages slidably a respective one of the second cam grooves 61.

When the driving barrel 40 is driven to rotate relative to the base barrel 10 by a motor (not shown), the first cam barrel 22 is therefore driven rotatably via the engagement between the driving grooves 51 and the driving pins 53. The rotation of the first cam barrel 22 relative to the base barrel 10 causes axial movements of the first cam barrel 22 and the first guide barrel 21 via the engagement between the first cam grooves 52 and the driving pins 53 and via the engagement between the flange portion 222 and the holding grooves 213. Since the first lens barrel 23 is non-rotatable relative to the base barrel 10 due to the first guide barrel 21, the rotation of the first cam barrel 22 relative to the base barrel 10 causes axial movement of the first lens barrel 23 relative to the first cam barrel 22 and the first guide barrel 21 via the engagement between the first lens grooves 223 and the first guide pins 232, i.e., the rotation of the driving barrel 40 drives the axial movement of the first lens barrel 23.

Since the second guide barrel 31 is non-rotatable relative to the base barrel 10 due to the engagement between the second blocks 314 and the second straight grooves 13, the rotation of the driving barrel 40 also leads to axial movements of the second guide barrel 31 and the second cam barrel 32 via the engagement between the second cam grooves 61 and the driven pins 62. Simultaneously, the rotation of the first cam barrel 22 that is driven by the rotation of the driving barrel 40 drives a synchronous rotation of the second cam barrel 32 relative to the base barrel 10 via the engagement between the engaging blocks 224 and the engaging grooves 323.

Since the second lens barrel 33 is non-rotatable relative to the base barrel 10 due to the second guide barrel 31, the rotation of the second cam barrel 32 relative to the base barrel 10 causes an axial movement of the second lens barrel 33 relative to the second cam barrel 32 and the second guide barrel 31 via the engagement between the second lens grooves 322 and the second guide pins 332, i.e., the rotation of the driving barrel 40 also drives the axial movement of the second lens barrel 33.

According to the abovementioned configuration, the zoom lens device of the present invention can switch between a telephoto state (see FIG. 15), where the first and second lens barrels 23, 33 stretch forward and are close to each other and the second cam barrel 32 is substantially sleeved in the first cam barrel 22, and a wide-angle state (see FIGS. 16 to 19), where the first and second lens barrels 23, 33 are far from each other and the second cam barrel 32 projects out of the first cam barrel 22 along the axis (X).

To sum up, when the first lens barrel 23 and the first cam barrel 22 are at their utmost stretching positions, the axial movement of the second lens barrel 33 is not limited by the position of the first cam barrel 22 along the axis (X) since the second lens barrel 33 is guided by the second cam barrel 32 which is movable along the axis (X) relative to the first cam barrel 22. As a result, a wider zoom adjusting range is obtained compared to the conventional zoom lens device devices disclosed in the prior art.

Moreover, while attaining a zoom adjusting range comparable to that of the abovementioned conventional zoom lens devices, the configuration of the zoom lens device in this invention allows a thinner thickness than that of the abovementioned conventional zoom lens devices.

Figure 20:
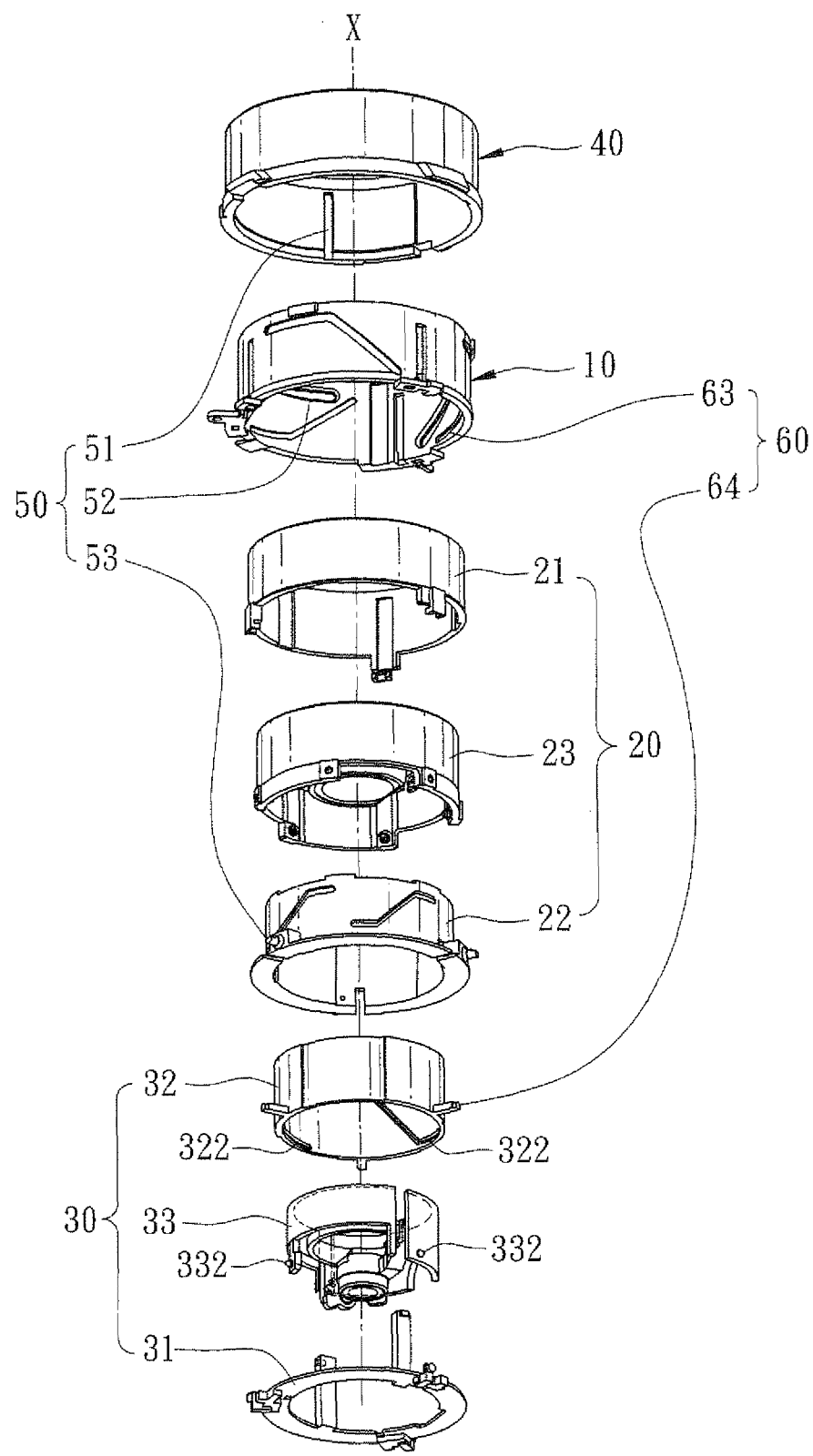
FIG. 20 is an exploded perspective view of a second preferred embodiment of the zoom lens device according to the invention.
Figure 21:
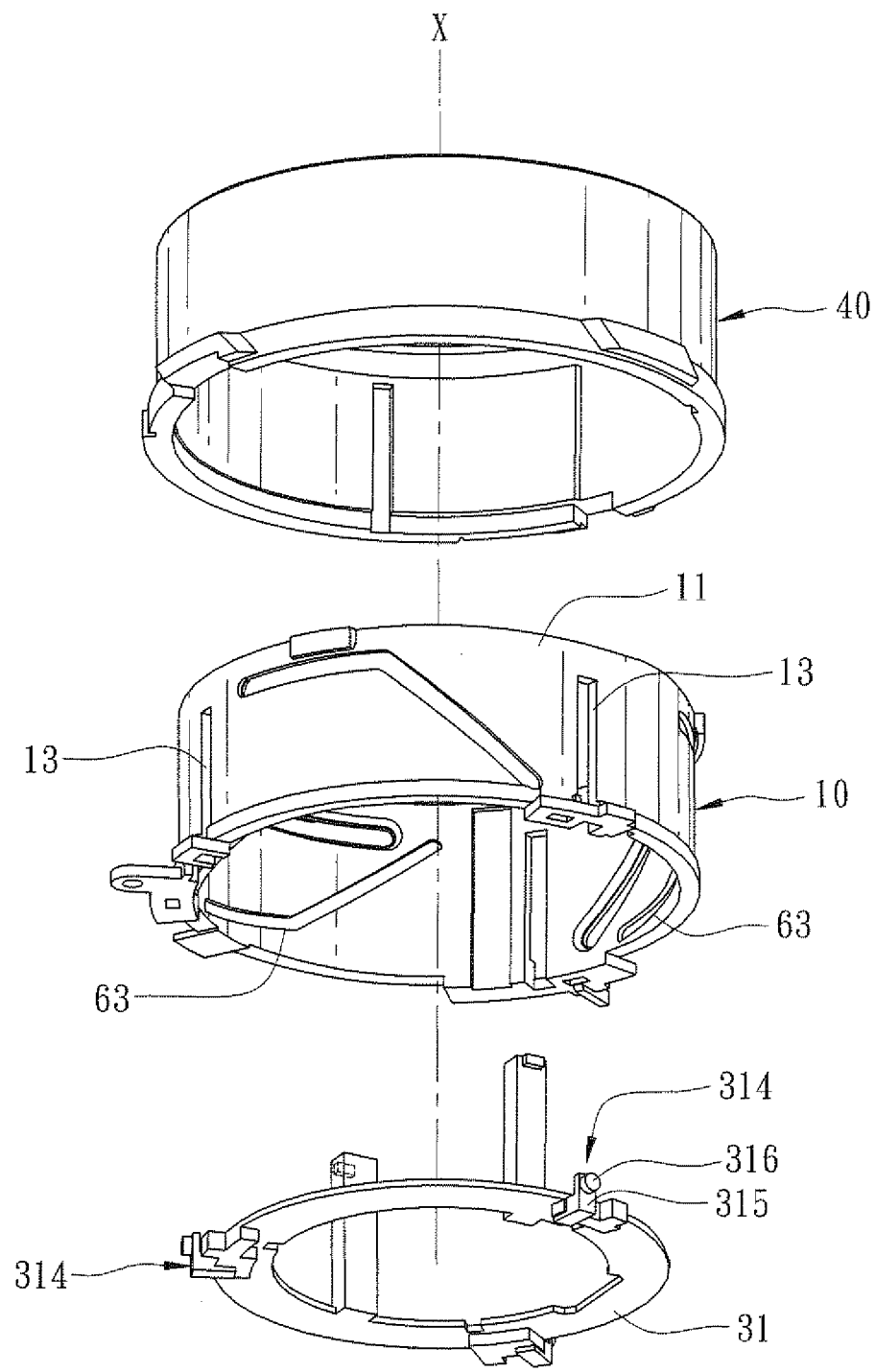
FIG. 21 is an exploded perspective view of a driving barrel, a base barrel and a second guide barrel of the second preferred embodiment.

As shown in FIGS. 20 and 21, a second preferred embodiment of the zoom lens device according to the present invention has a configuration similar to that of the first preferred embodiment. The differences between the first and second preferred embodiment are listed as follows.

Figure 23:
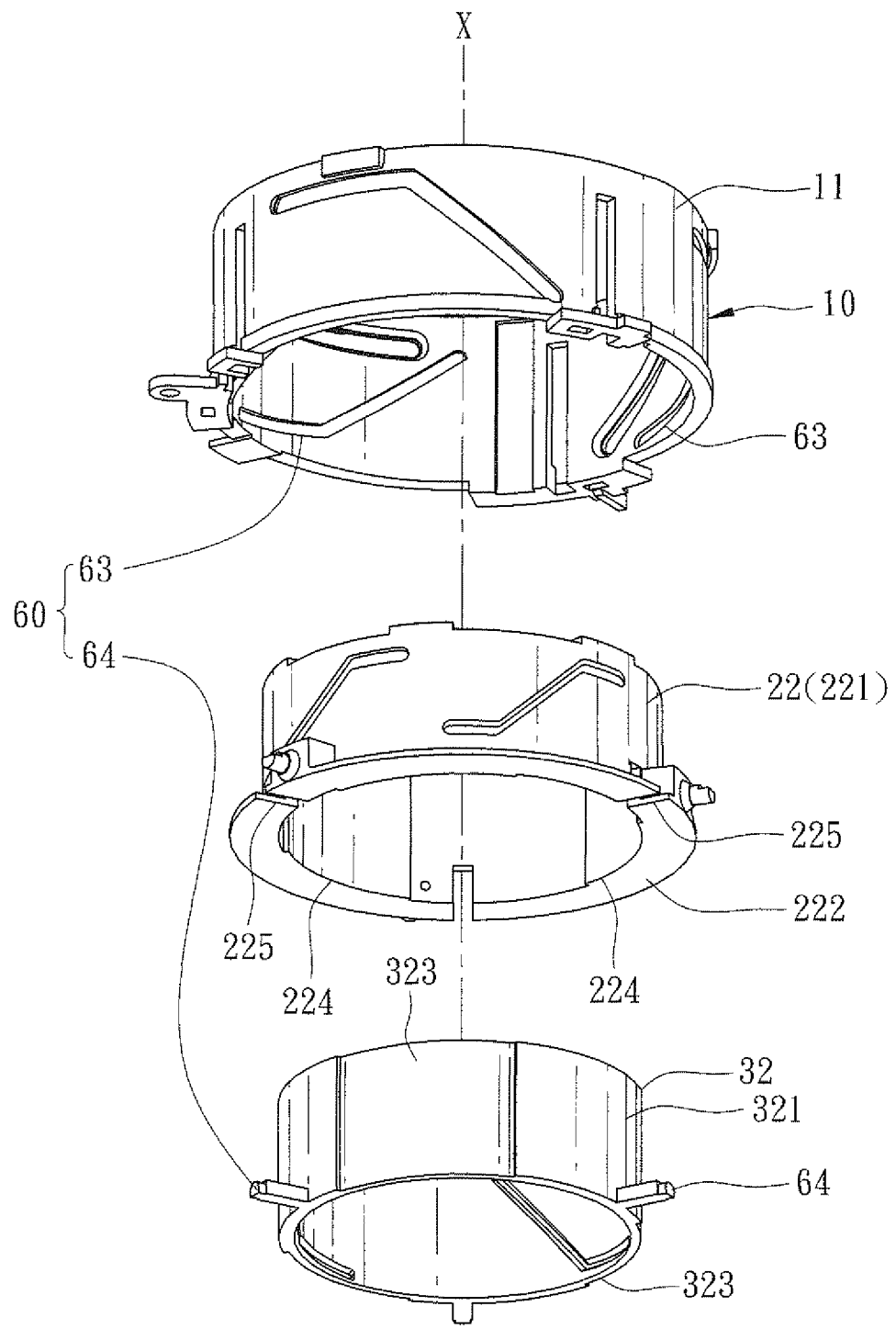
FIG. 23 is an exploded perspective view illustrating a driven mechanism of the second preferred embodiment.

In this embodiment, the driven mechanism 60 includes a plurality of angularly spaced-apart second cam grooves 63 formed in the inner surrounding surface of the base barrel wall 11 of the base barrel 10, and a plurality of angularly spaced-apart driven pins 64 disposed on the outer surrounding surface of the second cam barrel wall 321 of the second cam barrel 32 (see FIG. 23), and engaging slidably and respectively the second cam grooves 63.

Figure 22:
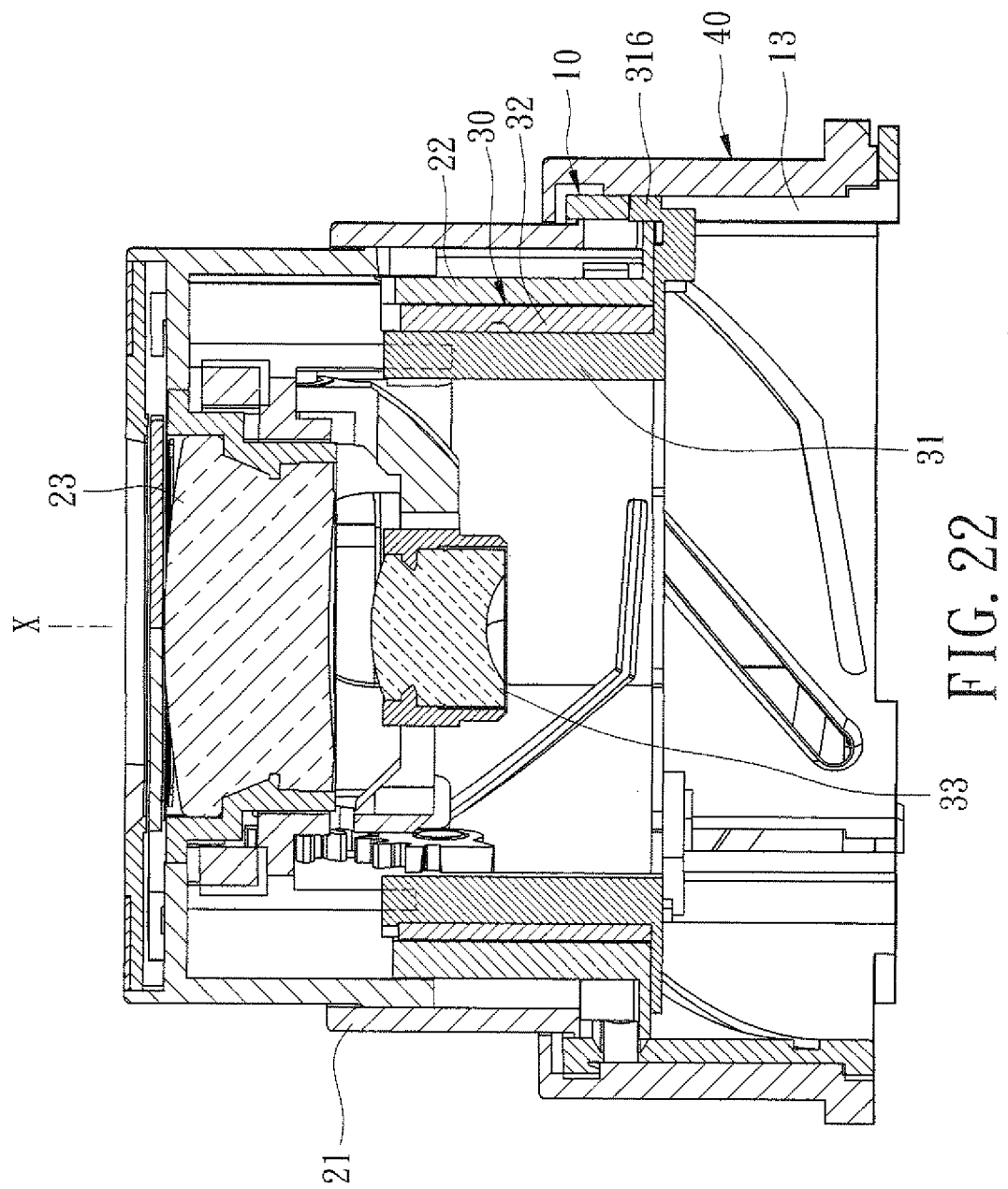
FIG. 22 is a sectional view of the second preferred embodiment in a telephoto state.

Each of the second blocks 314 of the second guide barrel 31 engages slidably a respective one of the second straight grooves 13 of the base barrel 10, and has a block portion 315 and a cylindrical portion 316. The cylindrical portions 316 are configured not to project out of the base barrel 10 (see FIGS. 21 and 22).

Figure 24:
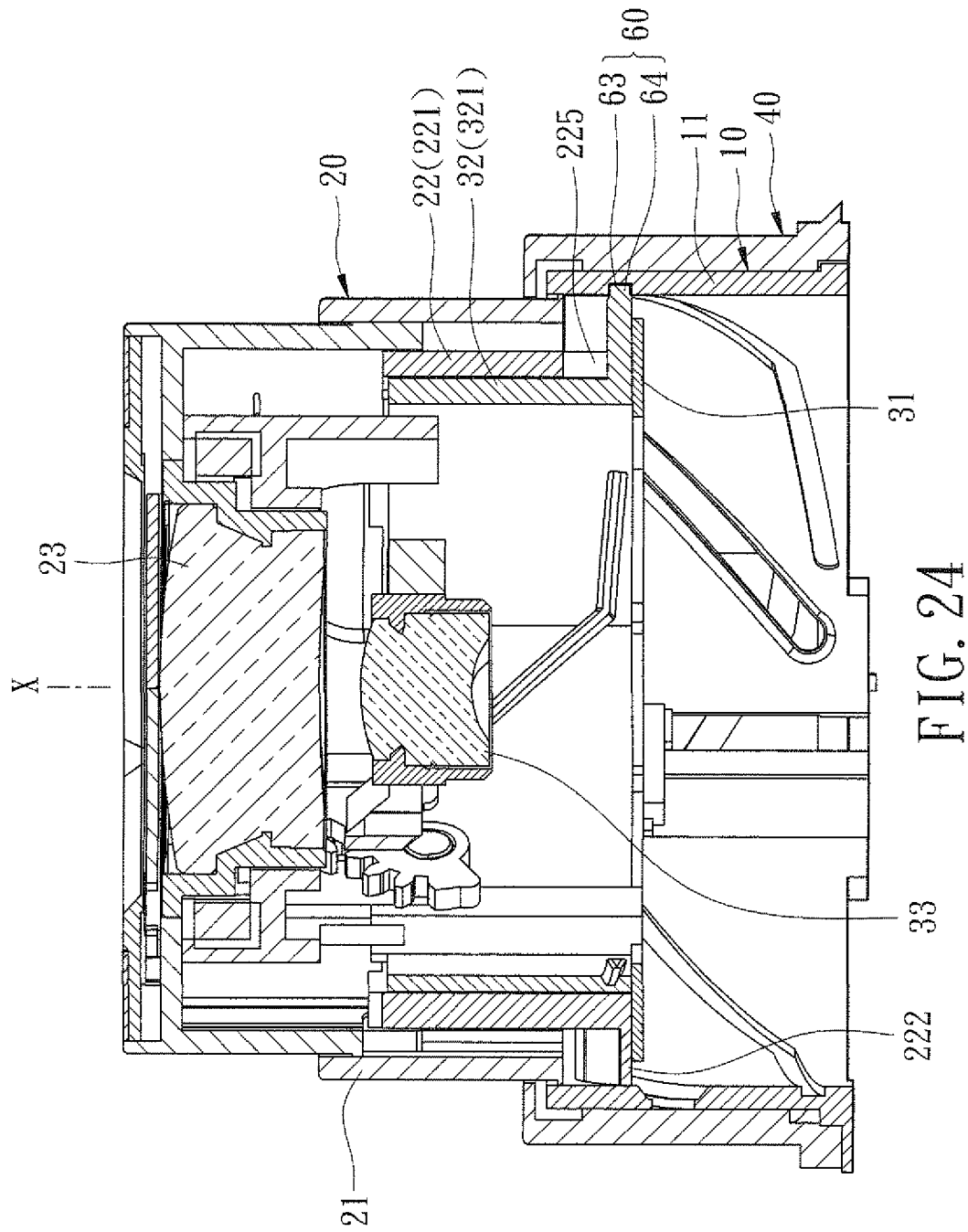
FIG. 24 is another sectional view of the second preferred embodiment in the telephoto state.

The first cam barrel 22 is further formed with a plurality of angularly spaced-apart retaining spaces 225 (see FIG. 23) extending through axially opposite side surfaces of the flange portion 222 and corresponding in angular position to the driven pins 64 for receiving the driven pins 64 respectively when the second cam barrel 32 is substantially sleeved in the first cam barrel 22 at the telephoto state of the zoom lens device (see FIG. 24).

When the driving barrel 40 is driven to rotate relative to the base barrel 10, the axial movement of a first lens barrel 23 is the same as that in the first preferred embodiment. The rotation of the first cam barrel 22 that is driven by the rotation of the driving barrel 40 drives a synchronous rotation of the second cam barrel 32 relative to the base barrel 10 via the engagement between engaging blocks 224 and engaging grooves 323, and therefore causes axial movements of the second guide barrel 31 and the second cam barrel 32 relative to the base barrel 10 via the engagement between the second cam grooves 63 and the driven pins 64.

Figure 25:
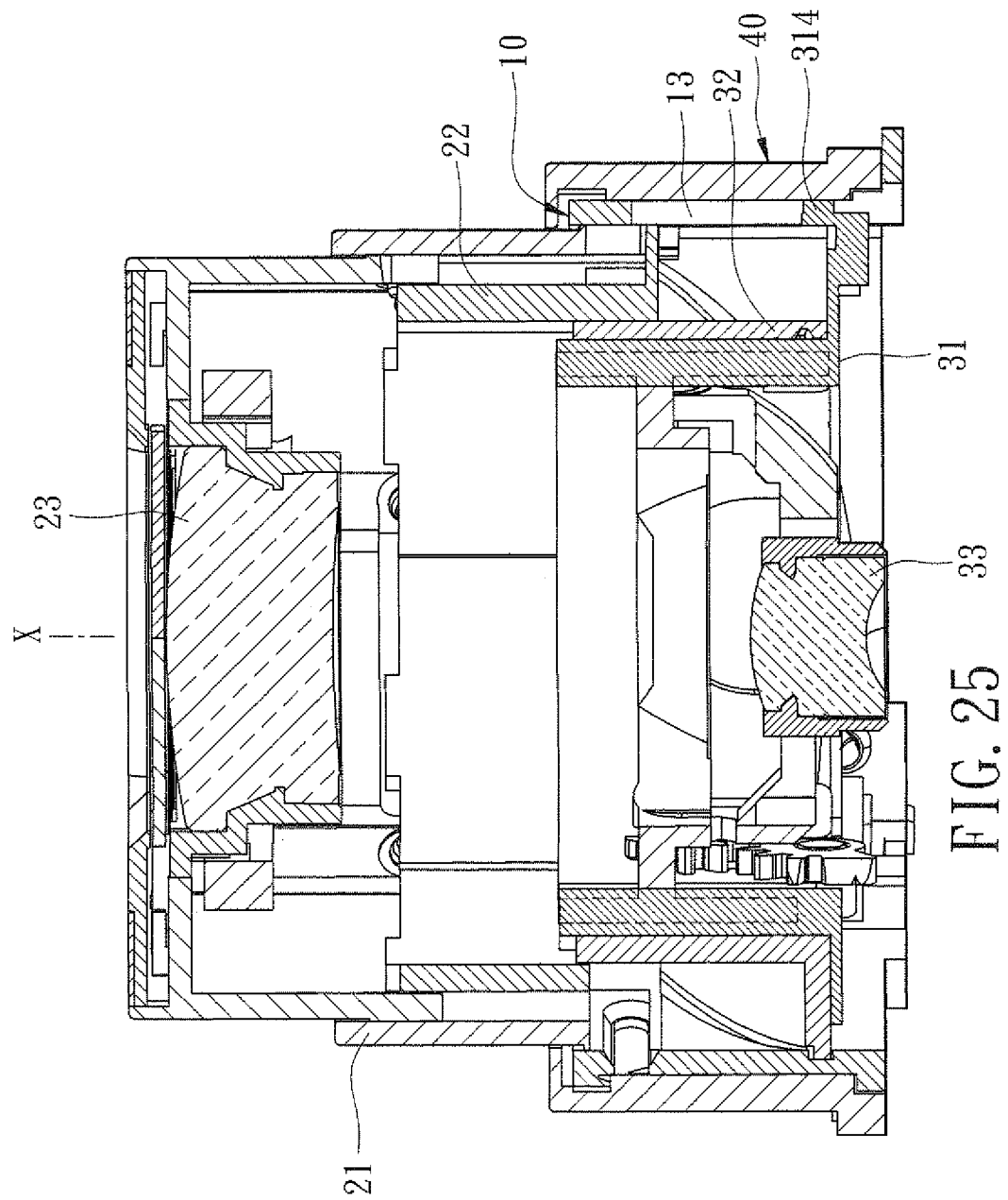
FIG. 25 is a sectional view of the second preferred embodiment in a wide-angle state.
Figure 26:
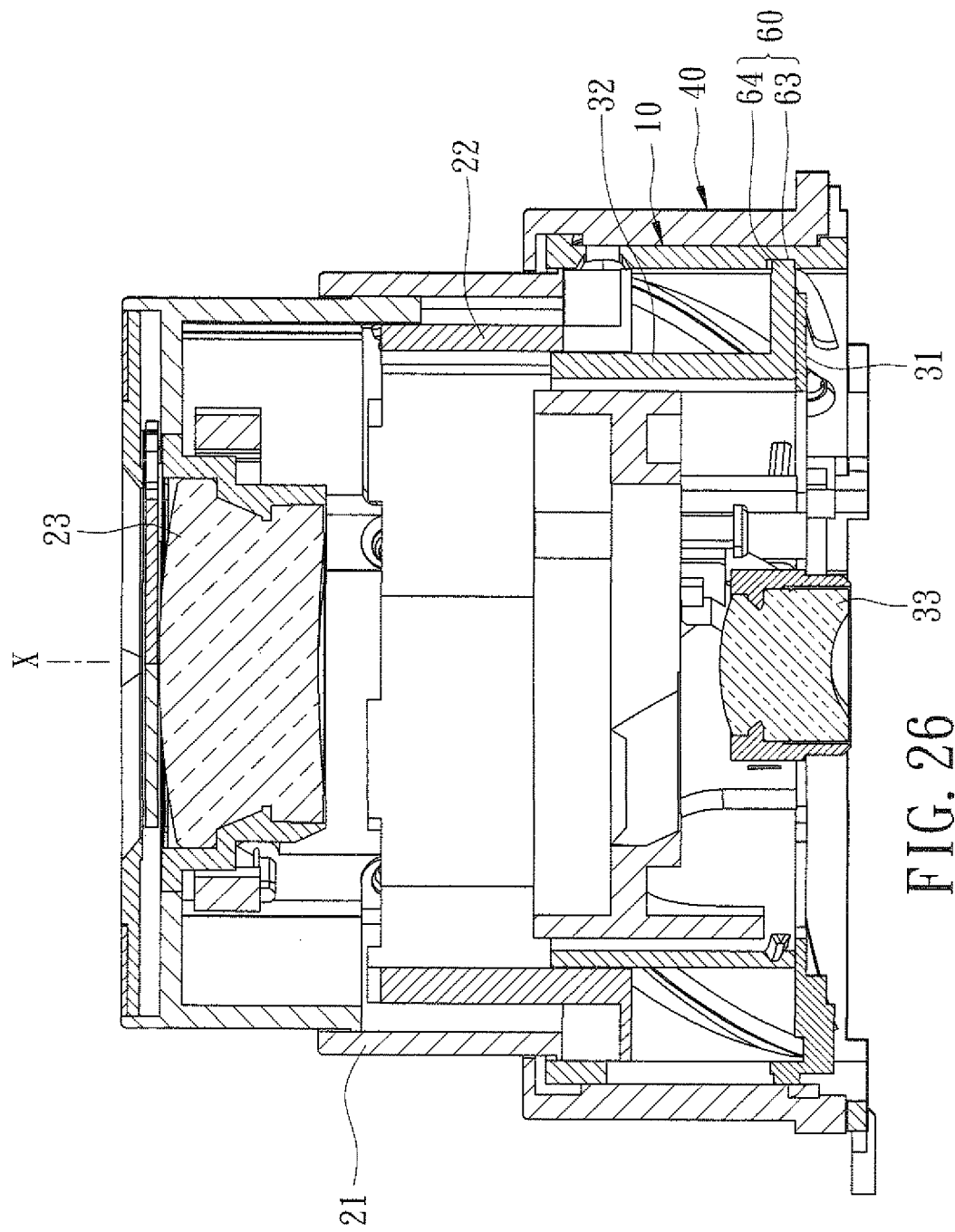
FIG. 26 is another sectional view of the second preferred embodiment in the wide-angle state.

Since the second lens barrel 33 is non-rotatable relative to the base barrel 10 due to the second guide barrel 31, the rotation of the second cam barrel 32 relative to the base barrel 10 causes an axial movement of the second lens barrel 33 relative to the second cam barrel 32 and the second guide barrel 31 via the engagement between second lens grooves 322 and second guide pins 332 (see FIG. 20), i.e., the rotation of the driving barrel 40 drives the axial movement of the second lens barrel 33. Therefore, the zoom lens device can switch between the telephoto state where the first and second lens barrels 23, 33 are close to each other, and the wide-angle state (see FIGS. 25 and 26) where the first and second lens barrels 23, 33 are far from each other.

As such, the second preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A zoom lens device comprising:
a base barrel surrounding an axis;
a first transmitting assembly including
a first guide barrel that is connected to an inner surrounding surface of said base barrel and that is movable relative to said base barrel along the axis,
a first cam barrel that is connected co-movably to and rotatable about the axis relative to said first guide barrel, and that is formed with a plurality of angularly spaced-apart first lens grooves, and
a first lens barrel that is connected to said first guide barrel, that is movable relative to said first guide barrel along the axis, and that has a plurality of angularly spaced-apart first guide pins engaging slidably and respectively said first lens grooves;
a second transmitting assembly including
a second guide barrel that is connected to said inner surrounding surface of said base barrel and that is movable relative to said base barrel along the axis,
a second cam barrel that is connected co-movably to and rotatable about the axis relative to said second guide barrel, that is connected co-rotatably to and movable along the axis relative to said first cam barrel, and that is formed with a plurality of angularly spaced-apart second lens grooves, and
a second lens barrel that is connected to said second guide barrel, that is movable relative to said second guide barrel along the axis, and that has a plurality of angularly spaced-apart second guide pins engaging slidably and respectively said second lens grooves;
a driving barrel surrounding said base barrel and rotatable about the axis;
a driving mechanism including
a plurality of angularly spaced-apart driving grooves that are formed in said driving barrel and that extend in a direction of the axis,
a plurality of angularly spaced-apart first cam grooves that are formed in said base barrel, and
a plurality of angularly spaced-apart driving pins that are disposed on said first cam barrel, each of said driving pins extending through and being slidable along a respective one of said first cam grooves, and engaging slidably a respective one of said driving grooves; and
a driven mechanism including
a plurality of angularly spaced-apart second cam grooves that are formed in one of said base barrel and said driving barrel, and
a plurality of angularly spaced-apart driven pins that are disposed on one of said second cam barrel and said second guide barrel that is angularly displaceable relative to said one of said base barrel and said driving barrel, each of said driven pins engaging slidably a respective one of said second cam grooves;

wherein, rotation of said driving barrel drives said first and second cam barrels to rotate synchronously and move individually along the axis via said driving and driven mechanisms, and therefore causes individual axial movements of said first and second lens barrels via said driving and driven mechanisms and via the engagement between said first guide pins and said first lens grooves and the engagement between said second guide pins and said second lens grooves, thereby resulting in zoom adjustment of said zoom lens device.

2. The zoom lens device as claimed in claim 1, wherein said second cam grooves are formed in said driving barrel, said driven pins being disposed on said second guide barrel.

3. The zoom lens device as claimed in claim 2, wherein said first guide barrel, said first lens barrel, said first cam barrel, said second cam barrel, said second guide barrel, and said second lens barrel are arranged in descending order of their distances from the axis, said first cam barrel having a plurality of angularly spaced-apart engaging blocks that extend in the direction of the axis, said second cam barrel having a plurality of angularly spaced-apart engaging grooves that extend in the direction of the axis and that are engaged slidably and respectively with said engaging blocks.

4. The zoom lens device as claimed in claim 3, wherein:
said base barrel has a plurality of angularly spaced-apart first straight grooves extending in the direction of the axis and a plurality of angularly spaced-apart second straight grooves extending in the direction of the axis;
said first guide barrel has a plurality of angularly spaced-apart first blocks engaging slidably and respectively said first straight grooves; and
said second guide barrel has a plurality of angularly spaced-apart second blocks engaging slidably and respectively said second straight grooves, each of said driven pins extending radially and outwardly from a respective one of said second blocks.

5. The zoom lens device as claimed in claim 3, wherein:
said first guide barrel has
a first guide barrel wall,
a plurality of angularly spaced-apart first blocks extending from an end of said first guide barrel wall in the direction of the axis and contained in said base barrel,
a plurality of angularly spaced-apart holding grooves, each of which is formed in an inner side of a respective one of said first blocks and extends in a circumferential direction with respect to the axis, and
a plurality of angularly spaced-apart first guide grooves formed in an inner surrounding surface of said first guide barrel wall and extending in the direction of the axis;
said first cam barrel has
a first cam barrel wall, and
an annular flange portion extending radially and outwardly from an end of said first cam barrel wall and engaging slidably said holding grooves, said first cam barrel wall having an outer surrounding surface formed with said driving pins and said first lens grooves, and an inner surrounding surface opposite to said outer surrounding surface and formed with said engaging blocks; and
said first lens barrel further has
a first lens barrel wall having opposite inner and outer surrounding surfaces, and
a plurality of angularly spaced-apart first guide blocks disposed on said outer surrounding surface of said first lens barrel wall and engaging slidably and respectively said first guide grooves, said first guide pins being disposed on said inner surrounding surface of said first lens barrel wall.

6. The zoom lens device as claimed in claim 3, wherein:
said second cam barrel has
a second cam barrel wall having opposite inner and outer surrounding surfaces, and opposite first and second annular end surfaces, said engaging grooves being formed in said outer surrounding surface of said second cam barrel wall, said second lens grooves being formed in said inner surrounding surface of said second cam barrel wall;
said second guide barrel has
a ring wall portion,
a pair of angularly spaced-apart second guide blocks extending from said ring wall portion, and
a pair of holding protrusions protruding radially, outwardly and respectively from ends of said second guide blocks distal from said ring wall portion, said first annular end surface of said second cam barrel wall being in slidable contact with said holding protrusions, said second annular end surface of said second cam barrel wall being in slidable contact with said ring wall portion; and
said second lens barrel further has
a second lens barrel wall, and
a pair of angularly spaced-apart second guide grooves formed in an outer surrounding surface of said second lens barrel wall and extending along the direction of the axis, said second guide grooves being engaged slidably and respectively with said second guide blocks, said second guide pins being disposed on said outer surrounding surface of said second lens barrel wall.

7. The zoom lens device as claimed in claim 1, wherein said second cam grooves are formed in said base barrel, said driven pins being disposed on said second cam barrel.

8. The zoom lens device as claimed in claim 7, wherein said first guide barrel, said first lens barrel, said first cam barrel, said second cam barrel, said second guide barrel, and said second lens barrel are arranged in descending order of their distances from the axis, said first cam barrel having a plurality of angularly spaced-apart engaging blocks that extend in the direction of the axis, said second cam barrel having a plurality of angularly spaced-apart engaging grooves that extend in the direction of the axis and that are engaged slidably and respectively with said engaging blocks.

9. The zoom lens as claimed in claim 8, wherein:
said base barrel has a plurality of angularly spaced-apart first straight grooves extending in the direction of the axis and a plurality of angularly spaced-apart second straight grooves extending in the direction of the axis;
said first guide barrel has a plurality of angularly spaced-apart first blocks engaging slidably and respectively said first straight grooves; and
said second guide barrel has a plurality of angularly spaced-apart second blocks engaging slidably and respectively said second straight grooves.

10. The zoom lens device as claimed in claim 8, wherein:
said first guide barrel has
a first guide barrel wall,
a plurality of angularly spaced-apart first blocks extending from an end of said first guide barrel wall in the direction of the axis and contained in said base barrel,
a plurality of angularly spaced-apart holding grooves, each of which is formed in an inner side of a respective one of said first blocks and extends in a circumferential direction with respect to the axis, and a plurality of angularly spaced-apart first guide grooves formed in an inner surrounding surface of said first guide barrel wall and extending in the direction of the axis;

said first cam barrel has
- a first cam barrel wall, and
- an annular flange portion extending radially and outwardly from an end of said first cam barrel wall and engaging slidably said holding grooves, said first cam barrel wall having an outer surrounding surface formed with said driving pins and said first lens grooves, and an inner surrounding surface opposite to said outer surrounding surface and formed with said engaging blocks;

said first cam barrel is further formed with a plurality of angularly spaced-apart retaining spaces that extend through axially opposite side surfaces of said flange portion and that correspond in angular position to said driven pins for retaining said driven pins respectively when said second cam barrel is sleeved in said first cam barrel, and said first lens barrel further has
- a first lens barrel wall having opposite inner and outer surrounding surfaces, and
- a plurality of angularly spaced-apart first guide blocks disposed on said outer surrounding surface of said first lens barrel wall and engaging slidably and respectively said first guide grooves, said first guide pins being disposed on said inner surrounding surface of said first lens barrel wall.

11. The zoom lens device as claimed in claim 8, wherein:

said second cam barrel has
- a second cam barrel wall having opposite inner and outer surrounding surfaces, and opposite first and second annular end surfaces, said driven pins being disposed on said outer surrounding surface of said second cam barrel wall, said engaging grooves being formed in said outer surrounding surface of said second cam barrel wall, said second lens grooves being formed in said inner surrounding surface of said second cam barrel wall;

said second guide barrel has
- a ring wall portion,
- a pair of angularly spaced-apart second guide blocks extending from said ring wall portion, and
- a pair of holding protrusions protruding radially, outwardly and respectively from ends of said second guide blocks distal from said ring wall portion, said first annular end surface of said second cam barrel wall being in slidable contact with said holding protrusions, said second annular end surface of said second cam barrel wall being in slidable contact with said ring wall portion; and said second lens barrel has
- a second lens barrel wall, and
- a pair of angularly spaced-apart second guide grooves formed in an outer surrounding surface of said second lens barrel wall and extending along the direction of the axis, said second guide grooves being engaged slidably and respectively with said second guide blocks, said second guide pins being disposed on said outer surrounding surface of said second lens barrel wall.

* * * * *